(12) United States Patent
Meyer et al.

(10) Patent No.: US 11,248,695 B2
(45) Date of Patent: Feb. 15, 2022

(54) PLANETARY GEAR AND GAS TURBINE ENGINE

(71) Applicant: Rolls-Royce Deutschland Ltd & Co KG, Blankenfelde-Mahlow (DE)

(72) Inventors: Franz Meyer, Berlin (DE); Jens Klostermann, Rangsdorf (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 233 days.

(21) Appl. No.: 16/431,267

(22) Filed: Jun. 4, 2019

(65) Prior Publication Data
US 2019/0376595 A1  Dec. 12, 2019

(30) Foreign Application Priority Data

Jun. 8, 2018 (DE) ...................... 10 2018 113 753.2

(51) Int. Cl.
*F16H 57/04* (2010.01)
*F02K 3/06* (2006.01)
(Continued)

(52) U.S. Cl.
CPC .......... *F16H 57/0427* (2013.01); *F02C 3/107* (2013.01); *F02C 7/36* (2013.01);
(Continued)

(58) Field of Classification Search
CPC ............ F16H 57/0406; F16H 57/0423; F16H 57/0427; F16H 57/043; F16H 57/046; F16H 57/0486; F16H 57/082; F16H 1/28; F02C 3/107; F02C 7/06; F02C 7/36; F02K 3/06; F05D 2260/40311; F05D 2260/98
See application file for complete search history.

(56) References Cited

U.S. PATENT DOCUMENTS

| 5,251,725 A * | 10/1993 | Barrett, Jr. .......... F16H 57/0456 184/6.14 |
| 8,777,792 B2 * | 7/2014 | Imai .................... F16H 57/0486 475/159 |

(Continued)

OTHER PUBLICATIONS

German Search Report dated Jan. 31, 2019 for counterpart German Patent Application No. 10 2018 113 753.2.

*Primary Examiner* — Jesse S Bogue
*Assistant Examiner* — Loren C Edwards
(74) *Attorney, Agent, or Firm* — Shuttleworth & Ingersoll, PLC; Timothy J. Klima

(57) ABSTRACT

A planetary gearbox includes a planet carrier, with a planetary gear rotatably disposed on the planet carrier, and a gear that meshes with the planetary gear, as well as a gas turbine engine having such a planetary gearbox. The planet carrier has an oil supply installation including a supply line for oil to an opening. The oil is directed out of the opening in the direction of the planetary gear and/or the gear. The oil supply installation in relation to a primary rotating direction of the planetary gear and/or the gear in front of the opening includes a shielding region which protrudes from an external side of the oil supply installation and which by way of the external side of the oil supply installation on a side that faces the primary rotating direction of the planetary gear and/or the gear, delimits an oil collection groove.

14 Claims, 22 Drawing Sheets

(51) Int. Cl.
*F02C 7/36* (2006.01)
*F16H 1/28* (2006.01)
*F16H 57/08* (2006.01)
*F02C 3/107* (2006.01)

(52) U.S. Cl.
CPC ............... *F02K 3/06* (2013.01); *F16H 1/28* (2013.01); *F16H 57/043* (2013.01); *F16H 57/0423* (2013.01); *F16H 57/0486* (2013.01); *F16H 57/082* (2013.01); *F05D 2260/232* (2013.01); *F05D 2260/40311* (2013.01); *F05D 2260/98* (2013.01); *F16H 57/0406* (2013.01)

(56) References Cited

U.S. PATENT DOCUMENTS

| | | | |
|---|---|---|---|
| 2011/0048856 A1* | 3/2011 | Thivierge | F16H 57/0406 184/6.11 |
| 2013/0095974 A1 | 4/2013 | Imai et al. | |
| 2013/0102432 A1 | 4/2013 | Imai et al. | |
| 2013/0225353 A1 | 8/2013 | Gallet et al. | |
| 2015/0065285 A1* | 3/2015 | McCune | F02C 3/107 475/159 |
| 2015/0300255 A1 | 10/2015 | Gallet et al. | |
| 2015/0377071 A1* | 12/2015 | Sawyers-Abbott | F02C 7/00 60/805 |

* cited by examiner

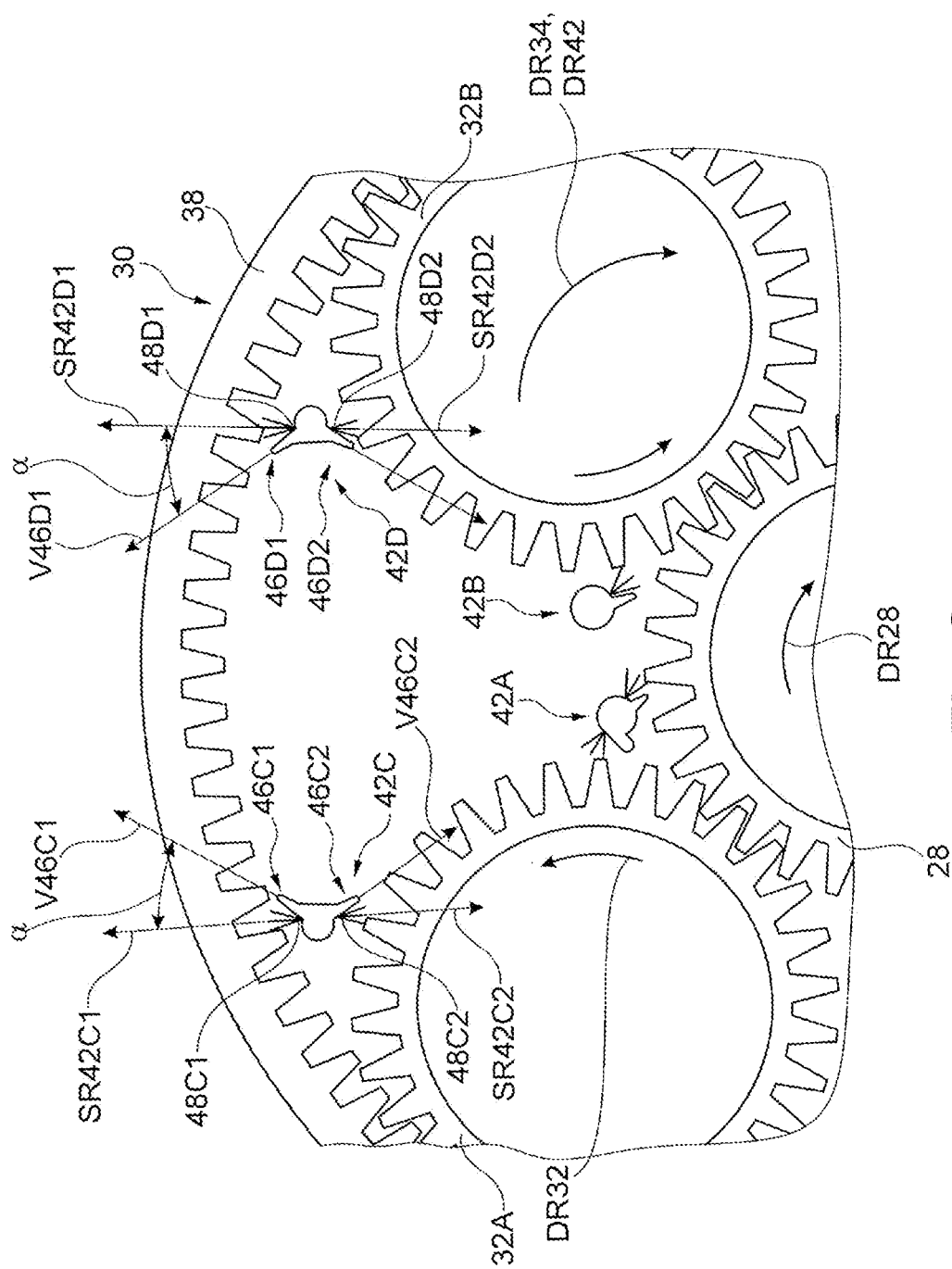

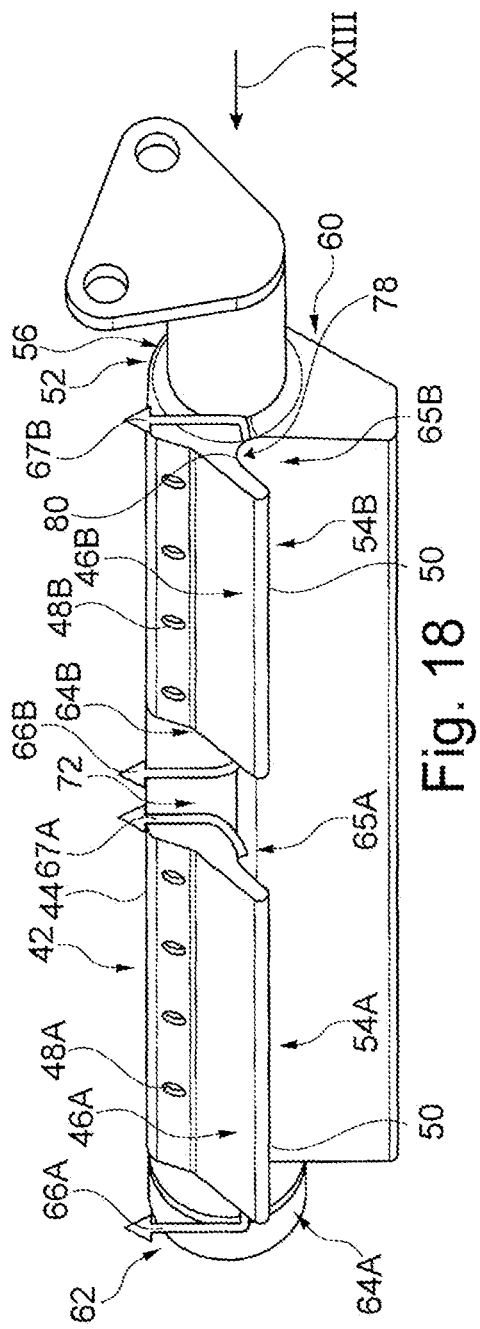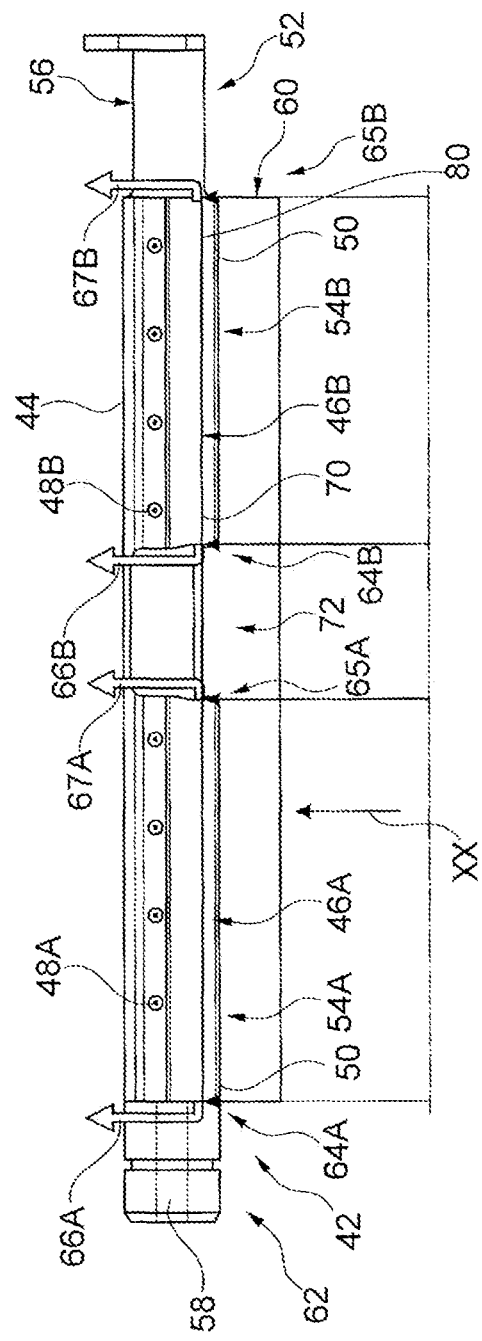

PLANETARY GEAR AND GAS TURBINE ENGINE

This application claims priority to German Patent Application DE102018113753.2 filed Jun. 8, 2018 the entirety of which is incorporated by reference herein.

The present disclosure relates to a planetary gearbox having a planet carrier, having at least one planetary gear that is disposed on the planet carrier, and having at least one gear that meshes with the planetary gear, wherein the planet carrier is configured having an oil supply installation which for the supplied oil comprises a supply line for oil to at least one opening. The present disclosure furthermore relates to a gas turbine engine for an aircraft.

A planetary gearbox of a gas turbine engine, or of a jet engine, respectively, is known in practice. The gearbox comprises a sun gear, a ring gear that is fixed to the housing, and a rotatable planet carrier by way of which a fan is capable of being driven. A plurality of planetary gears engage with the sun gear and with the ring gear. Oil is guided in the direction of tooth engagements between the planetary gears and the ring gear and between the planetary gears and the sun gear by way of an oil supply installation that is connected to the planet carrier of the gearbox.

For cooling and lubricating the gears of the planetary gearbox, the oil supply installation comprises oil supply installations which are also referred to as spray bars and which are disposed so as to be close to the gears and in particular the tooth engagements between the gears. The spray bars extend in the axial direction of the planetary gearbox and in the interior of said spray bars have at least one supply line. The supply line is connected to a plurality of openings or outlet openings, respectively, which are mutually spaced apart in the axial direction, such that oil supplied by way of the supply line can be applied to the gears via the outlet openings in a defined manner for cooling and lubricating the gears.

However, it is problematic that the oil which is applied to the gears in the operation of the planetary gearbox is ejected from the gears. The ejected oil in certain circumstances compromises the oil jets that exit the spray bars in the direction of the gears to such an extent that cooling and lubricating of the gears of the planetary gearbox can not be implemented to the desired extent and a service life of the planetary gearbox is compromised.

The intention is to make available a planetary gearbox and a gas turbine engine having a planetary gearbox which are in each case distinguished by a long service life.

This object is achieved by a planetary gearbox and by a gas turbine engine having features as disclosed herein.

According to a first aspect, a planetary gearbox having a planet carrier, having at least one planetary gear that is disposed so as to be rotatable on the planet carrier, and having at least one gear that meshes with the planetary gear, is provided. The planet carrier is configured having an oil supply installation which for the supplied oil comprises at least one supply line for oil to at least one opening. The oil for cooling and/or lubricating is capable of being directed out of the opening in the direction of the planetary gear and/or the gear. The oil supply installation in relation to a primary rotating direction of the planetary gear and/or the gear in front of the opening furthermore comprises at least one shielding region which protrudes from an external side of the oil supply installation and which by way of the external side of the oil supply installation on a side that faces the primary rotating direction of the planetary gear and/or the gear delimits an oil collection groove.

By means of the shielding region it is avoided in a simple manner in terms of construction that an oil jet that exits the opening of the oil supply installation is compromised by oil which is ejected from the planetary gear and/or from the gear. Sufficient cooling and/or lubricating of the planetary gear and/or the gear is thus guaranteed. It is additionally achieved herein that only oil that is temperature-controlled in a corresponding manner and potentially filtered by the oil supply installation is applied to the target gear, that is to say the planetary gear and/or the gear, on account of which a consistent quality of the oil lubrication and/or oil cooling can be ensured.

The shielding region in general represents a special add-on construction, or a protective shield, respectively, on the oil supply installation, or on a spray bar, respectively. The shielding region, or the add-on protective shield, respectively, herein is disposed in the flow path of the oil that is ejected from the planetary gear and/or the gear in the direction of the opening of the oil supply installation. The shielding region herein is embodied such that the ejected oil is collected by the shielding region and is accumulated in the oil collection groove and is subsequently capable of being discharged to a defined extent without compromising the oil cooling and/or oil lubrication.

According to a further aspect, the oil collection groove in the axial direction of the planet carrier, between two end regions of the oil collection groove, has a consistent depth. On account thereof, a volumetric flow of oil which is uniform over the width of the groove is ideally established in the axial direction of the planet carrier, or uniform volumetric flows of oil in the direction of the end regions are established, respectively, in the operation of the planetary gearbox, on account of which undesirable unbalanced operating states are avoided with minor complexity.

If a depth of the oil collection groove increases or decreases at least in portions in the axial direction of the planet carrier, between two end regions of the oil collection groove, a preferred flow direction of the oil in the oil collection groove is generated by means of the centrifugal force that acts on the oil in particular in the case of a rotating planet carrier and thus a rotating oil supply installation.

In the case of one embodiment of the planetary gearbox, the depth of the oil collection groove, proceeding from a center between two end regions of the oil collection groove, in the axial direction increases or decreases in the direction of the end regions, on account of which in turn a defined flow of the oil accumulated in the oil collection groove is in each case generated in a simple manner.

In the case of a further embodiment of the planetary gearbox, at least two shielding regions that are mutually spaced apart in the axial direction of the planet carrier are provided, said at least two shielding regions delimiting in each case one oil collection groove. Oil collected in the external end regions of the oil collection grooves as well as in the mutually facing end regions of the oil collection grooves is thus capable of being discharged from the oil collection grooves to a defined extent without compromising the defined directing of oil from the opening, or from the openings, respectively, of the oil supply installation in the direction of the sun gear and/or the gear.

According to a further aspect, the outflow direction of the oil from the opening is directed so as to be at least approximately radial onto the planetary gear or the gear.

There is furthermore the possibility for the opening and a profile of the shielding region, proceeding from the external side of the oil supply installation in the direction of a free end of the shielding region, to be mutually adapted such that the outflow direction and the profile of the shielding region run so as to be at least approximately mutually parallel, and mutually enclose an acute angle or an obtuse angle.

Cooling and/or lubricating of the planetary gear, the gear, and/or a tooth engagement region between the planetary gear and the gear is thus capable of being implemented in an installation-space-saving manner, without the oil jet exiting the opening being compromised by the oil which splashes from, or is ejected from, respectively, the planetary gear and/or the gear.

It can furthermore be provided that an outflow direction of the oil from the opening is directed so as to be at least approximately tangential onto the planetary gear and/or the gear. Any undesirable rebounding of the oil provided for cooling and/or lubricating from the planetary gear and/or from the gear is minor in this instance.

Additionally, it can also be provided that the opening and a profile of the shielding region, proceeding from the external side of the oil supply installation in the direction of a free end of the shielding region, are mutually adapted such that the outflow direction and the profile of the shielding region mutually enclose an acute or an obtuse angle. On account thereof, it is again achieved in a simple manner that the oil jet that is directed from the opening tangentially in the direction of the planetary gear and/or the gear is not compromised by the oil which is ejected from the planetary gear and/or from the gear to an extent that reduces a cooling and/or lubricating performance.

The oil supply installation represents an integrative component, and the angle that is to be designed in each case of the outflow direction of the oil from the at least one opening, the predefinition of the angle of the profile of the shielding region in relation to the main body, as well as of the angle between the outflow direction and the profile of the shielding region, depend on various parameters. Such parameters are, for example, a radial position of the oil supply installation within the planetary gearbox, a position of the oil supply installation relative to the gear, the installation space that is in each case available for the disposal of the oil supply installation, the injection direction of the oil, and the like. In general, the angle of the profile of the shielding region in relation to the direction of the splashed oil should be chosen to be as large as possible, since the shielding region in this instance offers a large collection face for the splashed oil, and the oil collection groove can receive a sufficiently large volume of oil. In this instance it is additionally ensured that either the shielding region, or the seal lip, respectively, or the main body per se, as a so-called dam acts in a shielding manner in relation to influences which result from a centrifugal force, or an inertia force, respectively, that potentially acts on the oil.

According to a further aspect, a plurality of oil supply installations are provided in the circumferential region of the sun gear and/or the gear.

Splashing of the oil which has accumulated in the region of the oil collection groove and which is ejected from the planetary gear and/or the gear is thereby avoided in a simple manner if the shielding region in the region of the oil collection groove is embodied having a porous material that absorbs oil, such as, for example, a metal foam or the like.

In the case of a further embodiment of the planetary gearbox, the planet carrier is embodied so as to be rotatable. Additionally, it can be provided that the shielding region protrudes from the external side of the oil supply installation in such a manner that the centrifugal force act on the oil accumulated in the oil collection groove in the case of a rotating planet carrier directs the oil in the direction of the base of the oil collection groove. In the case of such an embodiment it is again guaranteed in a simple manner in terms of construction that the oil which is ejected from the sun gear and/or the gear is collected by the shielding region and, without any further measures, flows into the oil collection groove, and from the latter is capable of being directed to a defined extent out of the tooth engagement region between the planetary gear and the gear, for example.

Depending on the case-specific application, the gear is a sun gear, a ring gear, and/or a further planetary gear that meshes with the planetary gear.

As noted elsewhere herein, the present disclosure can relate to a gas turbine engine. Such a gas turbine engine may comprise an engine core which comprises a turbine, a combustion chamber, a compressor, and a core shaft that connects the turbine to the compressor. Such a gas turbine engine can comprise a fan (having fan blades) which is positioned upstream of the engine core.

Arrangements of the present disclosure may be particularly, although not exclusively, beneficial for fans that are driven via a gearbox. Accordingly, the gas turbine engine can comprise a gearbox that receives an input from the core shaft and delivers a drive output to the fan for driving the fan at a lower rotating speed than the core shaft. The input to the gearbox can be performed directly from the core shaft or indirectly from the core shaft, for example via a spur shaft and/or a spur gear. The core shaft can be rigidly connected to the turbine and the compressor, such that the turbine and the compressor rotate at the same rotating speed (wherein the fan rotates at a lower rotating speed). The gearbox herein can be embodied as a planetary gearbox as has been described in more detail above.

The gas turbine engine as described and claimed herein can have any suitable general architecture. For example, the gas turbine engine can have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core can further comprise a second turbine, a second compressor, and a second core shaft which connects the second turbine to the second compressor. The second turbine, the second compressor, and the second core shaft can be disposed with a view to rotating at a higher rotating speed than the first core shaft.

In such an arrangement, the second compressor can be positioned so as to be axially downstream of the first compressor. The second compressor can be disposed with a view to receiving (for example directly receiving, for example by way of a generally annular duct) flow from the first compressor.

The gearbox can be disposed with a view to being driven by the core shaft (for example the first core shaft in the example above) which is configured to rotate (for example when in use) at the lowest rotating speed. For example, the gearbox can be disposed with a view to being driven only by the core shaft (for example only by the first core shaft, and not the second core shaft, in the example above) that is configured to rotate (for example when in use) at the lowest rotating speed. Alternatively thereto, the gearbox can be disposed with a view to being driven by one or a plurality of shafts, for example the first and/or the second shaft in the example above.

In the case of a gas turbine engine which is described and claimed herein, a combustion chamber can be provided so as to be axially downstream of the fan and the compressor(s).

For example, the combustion chamber can lie directly downstream of the second compressor (for example at the exit of the latter), when a second compressor is provided. By way of further example, the flow at the exit of the compressor can be supplied to the inlet of the second turbine, when a second turbine is provided. The combustion chamber can be provided so as to be upstream of the turbine(s).

The or each compressor (for example the first compressor and the second compressor as described above) may comprise any number of stages, for example multiple stages. Each stage may comprise a row of rotor blades and a row of stator vanes, the latter potentially being variable stator vanes (in that the angle of incidence of said stator vanes can be variable). The row of rotor blades and the row of stator vanes can be axially offset from each other.

The or each turbine (for example the first turbine and the second turbine as described above) may comprise any number of stages, for example multiple stages. Each stage may comprise a row of rotor blades and a row of stator vanes. The row of rotor blades and the row of stator vanes can be axially offset from each other.

Each fan blade may be defined as having a radial span extending from a root (or hub) at a radially inner gas-washed location, or a 0% span position in relation to a tip at a 100% span position. The ratio of the radius of the fan blade at the hub to the radius of the fan blade at the tip can be less than (or in the magnitude of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip can be in an inclusive range delimited by two of the values in the previous sentence (that is to say that the values can form upper or lower limits). These ratios may commonly be referred to as the hub-to-tip ratio. The radius at the hub and the radius at the tip can both be measured at the leading periphery (or the axially foremost periphery) of the blade. The hub-to-tip ratio refers, of course, to the gas-washed portion of the fan blade, that is to say the portion that is situated radially outside any platform.

The radius of the fan can be measured between the engine centerline and the tip of the fan blade at the leading periphery of the latter. The diameter of the fan (said diameter potentially simply being double the radius of the fan) can be larger than (or in the magnitude of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter can be in an inclusive range delimited by two of the values in the previous sentence (that is to say that the values can form upper or lower limits).

The rotating speed of the fan can vary when in use. Generally, the rotating speed is lower for fans with a comparatively large diameter. Purely by way of non-limiting example, the rotating speed of the fan at constant speed conditions can be less than 2500 rpm, for example less than 2300 rpm. Purely by way of further non-limiting example, the rotating speed of the fan at constant speed conditions for an engine having a fan diameter in the range from 250 cm to 300 cm (for example 250 cm to 280 cm) can also be in the range from 1700 rpm to 2500 rpm, for example in the range from 1800 rpm to 2300 rpm, for example in the range from 1900 rpm to 2100 rpm. Purely by way of further non-limiting example, the rotating speed of the fan at constant speed conditions for an engine having a fan diameter in the range from 320 cm to 380 cm can be in the range from 1200 rpm to 2000 rpm, for example in the range from 1300 rpm to 1800 rpm, for example in the range from 1400 rpm to 1600 rpm.

In use of the gas turbine engine, the fan (with associated fan blades) rotates about a rotation axis. This rotation results in the tip of the fan blade moving with a speed $U_{tip}$. The work done by the fan blades on the flow results in an enthalpy rise dH in the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which may be defined as the fan tip radius at the leading periphery multiplied by the angular speed). The fan tip loading at constant speed conditions can be more than (or in the magnitude of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values can form upper or lower limits).

Gas turbine engines according to the present disclosure can have any desired bypass ratio, wherein the bypass ratio is defined as the ratio of the mass flow rate of the flow through the bypass duct to the mass flow rate of the flow through the core at constant speed conditions. In the case of some arrangements, the bypass ratio can be more than (or in the magnitude of): 10, 10.5, 11, 11.5, 12, 12.5, 13, 13.5, 14, 14.5, 15, 15.5, 16, 16.5, or 17. The bypass ratio can be in an inclusive range delimited by two of the values in the previous sentence (that is to say that the values can form upper or lower limits). The bypass duct can be substantially annular. The bypass duct can be situated radially outside the engine core. The radially outer surface of the bypass duct can be defined by an engine nacelle and/or a fan casing.

The overall pressure ratio of a gas turbine engine as described and claimed herein can be defined as the ratio of the stagnation pressure upstream of the fan to the stagnation pressure at the exit of the highest pressure compressor (before the entry to the combustion chamber). By way of non-limiting example, the overall pressure ratio of a gas turbine engine as described and claimed herein at constant speed can be greater than (or in the magnitude of): 35, 40, 45, 50, 55, 60, 65, 70, 75. The overall pressure ratio can be in an inclusive range delimited by two of the values in the previous sentence (that is to say that the values can form upper or lower limits).

The specific thrust of a gas turbine engine can be defined as the net thrust of the gas turbine engine divided by the total mass flow through the engine. The specific thrust of an engine as described and/or claimed herein at constant speed conditions can be less than (or in the magnitude of): 110 $Nkg^{-1}$ s, 105 $Nkg^{-1}$s, 100 $Nkg^{-1}$s, 95 $Nkg^{-1}$s, 90 $Nkg^{-1}$s, 85 $Nkg^{-1}$s or 80 $Nkg^{-1}$s. The specific thrust can be in an inclusive range delimited by two of the values in the previous sentence (that is to say that the values can form upper or lower limits). Such gas turbine engines can be particularly efficient in comparison with conventional gas turbine engines.

A gas turbine engine as described and claimed herein can have any desired maximum thrust. Purely by way of a non-limiting example, a gas turbine as described and/or claimed herein can be capable of generating a maximum thrust of at least (or in the magnitude of): 160 kN, 170 kN, 180 kN, 190 kN, 200 kN, 250 kN, 300 kN, 350 kN, 400 kN, 450 kN, 500 kN, or 550 kN. The maximum thrust can be in an inclusive range delimited by two of the values in the previous sentence (that is to say that the values can form upper or lower limits). The thrust referred to above can be the maximum net thrust at standard atmospheric conditions at sea level plus 15 deg C. (ambient pressure 101.3 kPa, temperature 30 deg C.), at a static engine.

When in use, the temperature of the flow at the entry to the high-pressure turbine can be particularly high. This temperature, which may be referred to as TET, can be measured at the exit to the combustion chamber, for example directly upstream of the first turbine vane, which in turn can be referred to as a nozzle guide vane. At constant speed, the TET can be at least (or in the magnitude of): 1400 K, 1450 K, 1500 K, 1550 K, 1600 K, or 1650 K. The TET at constant speed can be in an inclusive range delimited by two of the values in the previous sentence (that is to say that the values can form upper or lower limits). The maximum TET in the use of the engine can be at least (or in the magnitude of), for example: 1700 K, 1750 K, 1800 K, 1850 K, 1900 K, 1950 K, or 2000 K. The maximum TET can be in an inclusive range delimited by two of the values in the previous sentence (that is to say that the values can form upper or lower limits). The maximum TET may occur, for example, at a high thrust condition, for example at a maximum take-off thrust (MTO) condition.

A fan blade and/or an airfoil portion of a fan blade as described herein can be manufactured from any suitable material or a combination of materials. For example, at least a part of the fan blade and/or airfoil can be manufactured at least in part from a composite, for example a metal matrix composite and/or an organic matrix composite, such as carbon fiber. By way of further example, at least a part of the fan blade and/or airfoil can be manufactured at least in part from a metal, such as a titanium-based metal or an aluminum-based material (such as an aluminum-lithium alloy) or a steel-based material. The fan blade can comprise at least two regions which are manufactured using different materials. For example, the fan blade can have a protective leading periphery, which is manufactured using a material that is better able to resist impact (for example from birds, ice, or other material) than the rest of the blade. Such a leading periphery can, for example, be manufactured using titanium or a titanium-based alloy. Thus, purely by way of example, the fan blade can have a carbon-fiber- or aluminum-based body (such as an aluminum-lithium alloy) with a titanium leading periphery.

A fan as described herein can comprise a central portion from which the fan blades can extend, for example in a radial direction. The fan blades can be attached to the central portion in any desired manner. For example, each fan blade can comprise a fixing device which can engage with a corresponding slot in the hub (or disk). Purely by way of example, such a fixing device can be in the form of a dovetail that can slot into and/or engage with a corresponding slot in the hub/disk in order for the fan blade to be fixed to the hub/disk. By way of further example, the fan blades can be formed integrally having a central portion. Such an arrangement may be referred to as a blisk or a bling. Any suitable method can be used to manufacture such a blisk or such a bling. For example, at least a part of the fan blades can be machined from a block and/or at least a part of the fan blades can be attached to the hub/disk by welding, such as linear friction welding, for example.

The gas turbine engines as described and claimed herein can or cannot be provided with a variable area nozzle (VAN). Such a variable area nozzle can allow the exit cross section of the bypass duct to be varied when in use. The general principles of the present disclosure can apply to engines with or without a VAN.

The fan of a gas turbine engine as described and claimed herein can have any desired number of fan blades, for example 16, 18, 20, or 22 fan blades.

As used herein, constant speed conditions can mean constant speed conditions of an aircraft to which the gas turbine engine is attached. Such constant speed conditions can be conventionally defined as the conditions at mid-cruise, for example the conditions experienced by the aircraft and/or the gas turbine engine at the midpoint (in terms of time and/or distance) between end of climb and start of descent.

Purely by way of example, the forward speed at the constant speed condition can be any point in the range from Mach 0.7 to 0.9, for example 0.75 to 0.85, for example 0.76 to 0.84, for example 0.77 to 0.83, for example 0.78 to 0.82, for example 0.79 to 0.81, for example in the magnitude of Mach 0.8, in the magnitude of Mach 0.85, or in the range from 0.8 to 0.85. Any arbitrary speed within these ranges can be the constant cruise condition. In the case of some aircraft, the constant cruise conditions can be outside these ranges, for example below Mach 0.7 or above Mach 0.9.

Purely by way of example, the constant speed conditions can correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example in the magnitude of 11,000 m. The constant cruise conditions may correspond to standard atmospheric conditions at any arbitrary altitude in these ranges.

Purely by way of example, the constant speed conditions can correspond to the following: a forward Mach number of 0.8; a pressure of 23,000 Pa; and a temperature of −55 deg C.

As used anywhere herein, "constant speed" or "constant speed conditions" can mean the aerodynamic design point. Such an aerodynamic design point (or ADP) can correspond to the conditions (including, for example, the Mach number, environmental conditions, and thrust requirement) for which the fan is designed to operate. This can mean, for example, the conditions at which the fan (or the gas turbine engine) in terms of construction has optimum efficiency.

When in use, a gas turbine engine as described and claimed herein can operate at the constant speed conditions defined elsewhere herein. Such constant speed conditions can be determined by the constant speed conditions (for example the mid-cruise conditions) of an aircraft to which at least one (for example 2 or 4) gas turbine engine can be fastened in order for the propulsion force to be provided.

It is self-evident to a person skilled in the art that a feature or parameter described above in relation to one of the above aspects can be applied to any other aspect, unless they are mutually exclusive. Furthermore, except where mutually exclusive, any feature or any parameter described herein may be applied to any aspect and/or be combined with any other feature or parameter described herein.

Embodiments will now be described, by way of example, with reference to the figures.

In the figures:

FIG. 4 to FIG. 9 show in each case an enlarged illustration of a region IV, as identified in more detail in FIG. 3, of different embodiments of the planetary gearbox;

FIG. 18 shows a three-dimensional illustration of a further embodiment of an oil supply installation;

FIG. 19 shows the oil supply installation according to FIG. 18 from a view XIX as identified in more detail in FIG. 18;

Figure 1:
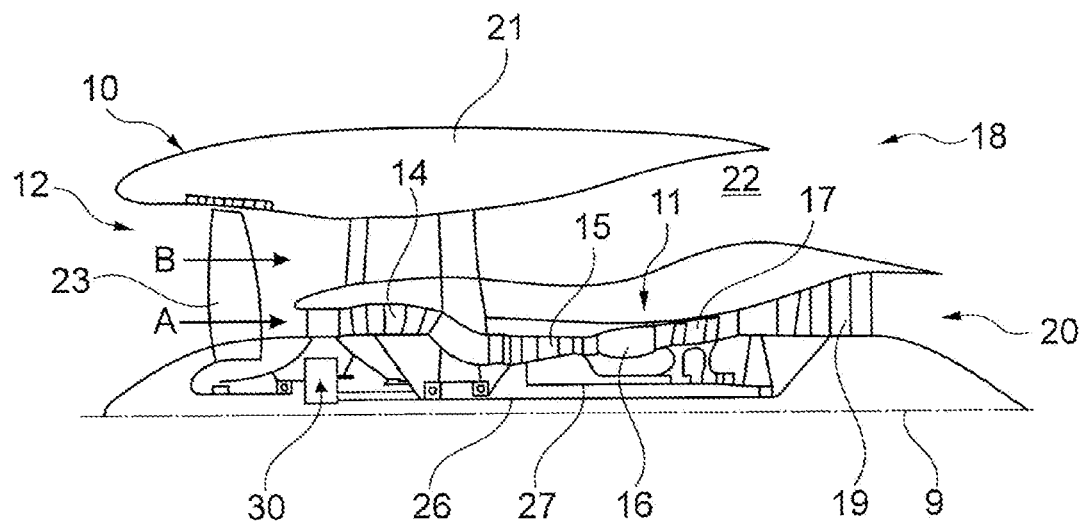
FIG. 1 shows a longitudinal sectional view of a gas turbine engine having a planetary gearbox.

FIG. 1 illustrates a gas turbine engine 10 with a primary axis of rotation 9. The engine 10 comprises an air intake 12 and a thrust fan 23 that generates two airflows: a core airflow A and a bypass airflow B. The gas turbine engine 10 comprises an engine core 11 that receives the core airflow A. In the sequence of axial flow, the engine core 11 comprises a low-pressure compressor 14, a high-pressure compressor 15, a combustion installation 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass airflow B flows through the bypass duct 22. The fan 23 is attached to the low-pressure turbine 19 via a shaft 26 and a planetary gearbox 30, and is driven by said low-pressure turbine 19. The shaft 26 herein is also referred to as the core shaft.

When in use, the core airflow A is accelerated and compressed by the low-pressure compressor 14 and directed into the high-pressure compressor 15 where further compression takes place. The compressed air exhausted from the high-pressure compressor 15 is directed into the combustion installation 16, where it is mixed with fuel and the mixture is combusted. The resultant hot combustion products then expand through, and thereby drive, the high-pressure and low-pressure turbines 17, 19 before being discharged through the core thrust nozzle 20 in order to provide a certain thrust force. The high-pressure turbine 17 drives the high-pressure compressor 15 by way of a suitable connecting shaft 27, which is also referred to as the core shaft. The fan 23 generally provides the majority of the propulsion force. The planetary gearbox 30 is a reduction gearbox.

Figure 2:
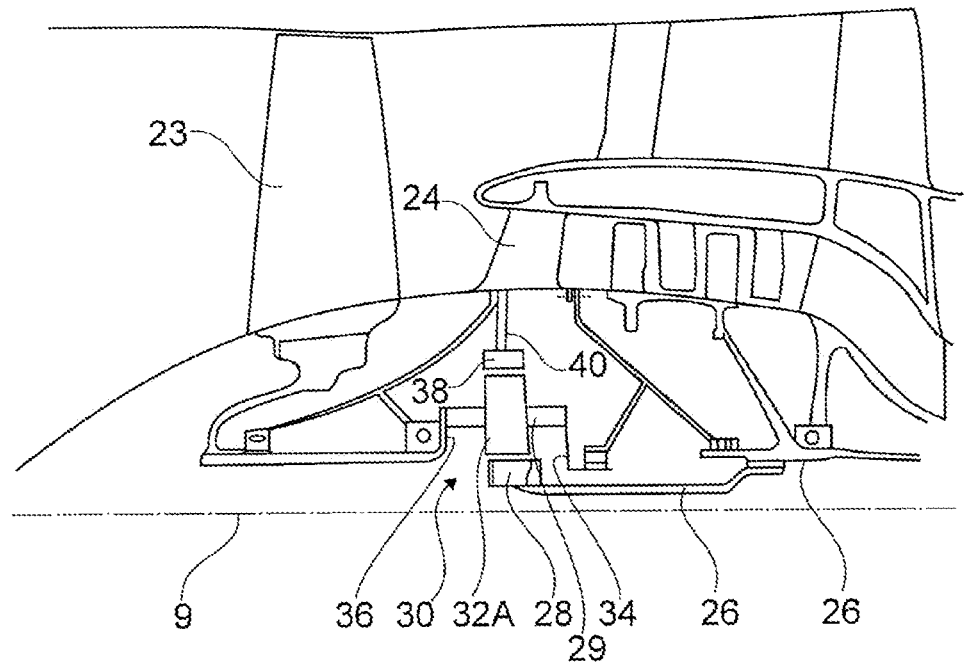
FIG. 2 shows an enlarged partial longitudinal sectional view of an upstream portion of a gas turbine engine.

An exemplary arrangement for a geared fan gas turbine engine 10 is shown in FIG. 2. The low-pressure turbine 19 drives the shaft 26 which is coupled to a sun gear 28 of the planetary gearbox 30. A plurality of planetary gears 32A to 32D which are illustrated in more detail in FIG. 3 and which are coupled to one another by way of a planet carrier 34 are situated radially outside the sun gear 28 and thus mesh with the latter, and are in each case disposed so as to be rotatable on carrier elements 29 that are connected in a rotationally fixed manner to the planet carrier 34. The planet carrier 34 restricts the planetary gears 32A to 32D to orbiting in a synchronized manner about the sun gear 28, while said planet carrier 34 enables that each planetary gear 32A to 32D can rotate about its own axis on the carrier elements 29. The planet carrier 34 by way of linkages 36 is coupled to the fan 23 with a view to driving the rotation of the latter about the engine axis 9. An external gear or ring gear 38 is situated so as to be radially outside the planetary gears 32A to 32D and thus to mesh with the latter, said external gear or ring gear 38 by way of a linkage 40 being coupled to a stationary and rotationally fixed support structure 24.

It is noted that the terms "low-pressure turbine" and "low-pressure compressor" as used herein may be taken to mean the lowest pressure turbine stage and the lowest pressure compressor stage (that is to say not including the fan 23) respectively and/or the turbine and compressor stages that are connected to one another by the connecting shaft 26 with the lowest rotating speed in the engine (that is to say not including the gearbox output shaft that drives the fan 23). In some literature, the "low-pressure turbine" and "low-pressure compressor" referred to herein may alternatively be known as the "intermediate pressure turbine" and "intermediate-pressure compressor". Where such alternative nomenclature is used, the fan 23 may be referred to as a first, or lowest pressure, compression stage.

Figure 3:
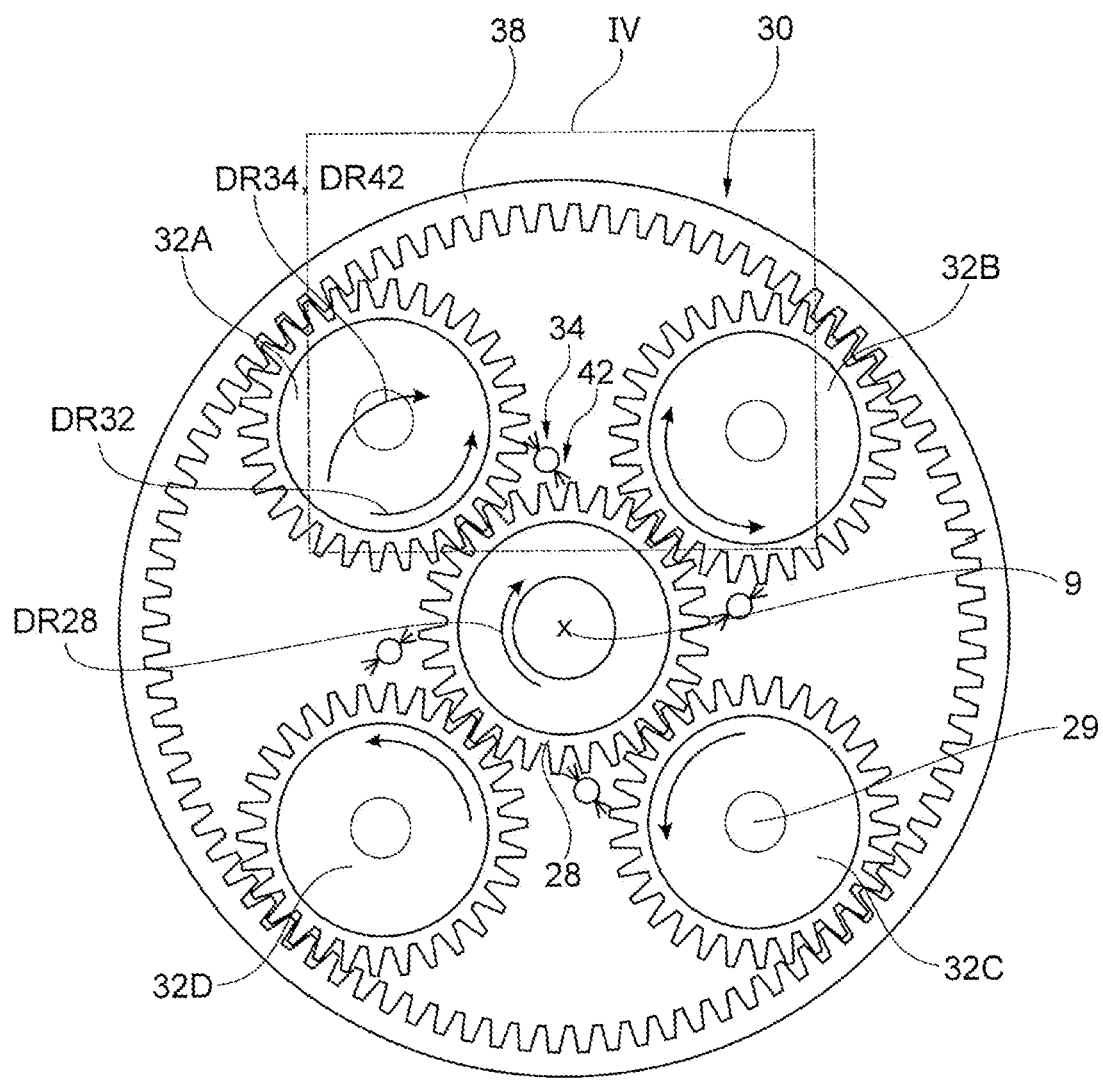
FIG. 3 shows a planetary gearbox for a gas turbine engine in a standalone view.

The planetary gearbox 30 is shown in more detail in an exemplary manner in FIG. 3. The sun gear 28, the planetary gears 32A to 32D, and the ring gear 38 for meshing with the other gears comprise in each case teeth about their periphery. While four planetary gears 32A to 32D are illustrated, it will be apparent to the person skilled in the art that more or fewer than four planetary gears can be provided within the scope of protection of the claimed invention. Practical applications of a planetary gearbox 30 generally comprise at least three planetary gears.

The epicyclic gearbox 30 illustrated by way of example in FIGS. 2 and 3 is a planetary gearbox in which the planet carrier 34 by way of linkages 36 is coupled to an output shaft, wherein the ring gear 38 is established on the housing. However, any other suitable type of epicyclic gearbox 30 can be used. As a further example, the epicyclic gearbox 30 can have a star arrangement in which the planet carrier 34 is held in a rotationally fixed manner and the ring gear 38 is rotatable. In the case of such an arrangement, the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is only exemplary, and various alternatives are within the scope of protection of the present disclosure. Purely by way of example, any suitable arrangement can be used for positioning the planetary gearbox 30 in the gas turbine engine 10 and/or for connecting the planetary gearbox 30 to the gas turbine engine 10. By way of further example, the connections (for example the linkages 36, 40 in the example of FIG. 2) between the planetary gearbox 30 and other parts of the engine 10 (such as, for example, the input shaft 26, the output shaft, and the established structure 24) can have a certain degree of stiffness or flexibility. By way of further example, any suitable arrangement of the bearings between rotating and stationary parts of the engine (for example between the input and output shafts of the planetary gearbox and the established structures, such as, for example, the gearbox casing) can be used, and the disclosure is not limited to the exemplary arrangement of FIG. 2. For example, where the planetary gearbox 30 has a star arrangement (described above), the skilled person would readily understand that the arrangement of output and support linkages and bearing positions would typically be different to those shown in an exemplary manner in FIG. 2.

Accordingly, the present disclosure extends to a gas turbine engine having an arbitrary arrangement of gearbox types (for example star-shaped or planetary), support structures, input and output shaft arrangement, and bearing positions.

Optionally, the gearbox can drive additional and/or alternative components (for example the intermediate-pressure compressor and/or a booster compressor).

Other gas turbine engines to which the present disclosure can be applied can have alternative configurations. For example, engines of this type can have an alternative number of compressors and/or turbines and/or an alternative number of connecting shafts. By way of further example, the gas turbine engine shown in FIG. 1 has a split flow nozzle 20, 22, meaning that the flow through the bypass duct 22 has a dedicated nozzle that is separate from and radially outside the engine core nozzle 20. However, this is not limiting, and any aspect of the present disclosure can also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) can have an established or variable region. Whilst the described example relates to a turbofan engine, the disclosure can apply, for example, to any type of gas turbine engine, such as, for example, an open rotor (in which the fan stage is not surrounded by an engine nacelle) or turboprop engine.

The geometry of the gas turbine engine 10, and components thereof, is or are defined using a conventional axis system which comprise an axial direction (which is aligned with the axis of rotation 9), a radial direction (in the direction from bottom to top in FIG. 1), and a circumferential direction (perpendicular to the view in FIG. 1). The axial, radial and circumferential directions run so as to be mutually perpendicular.

Figure 4:
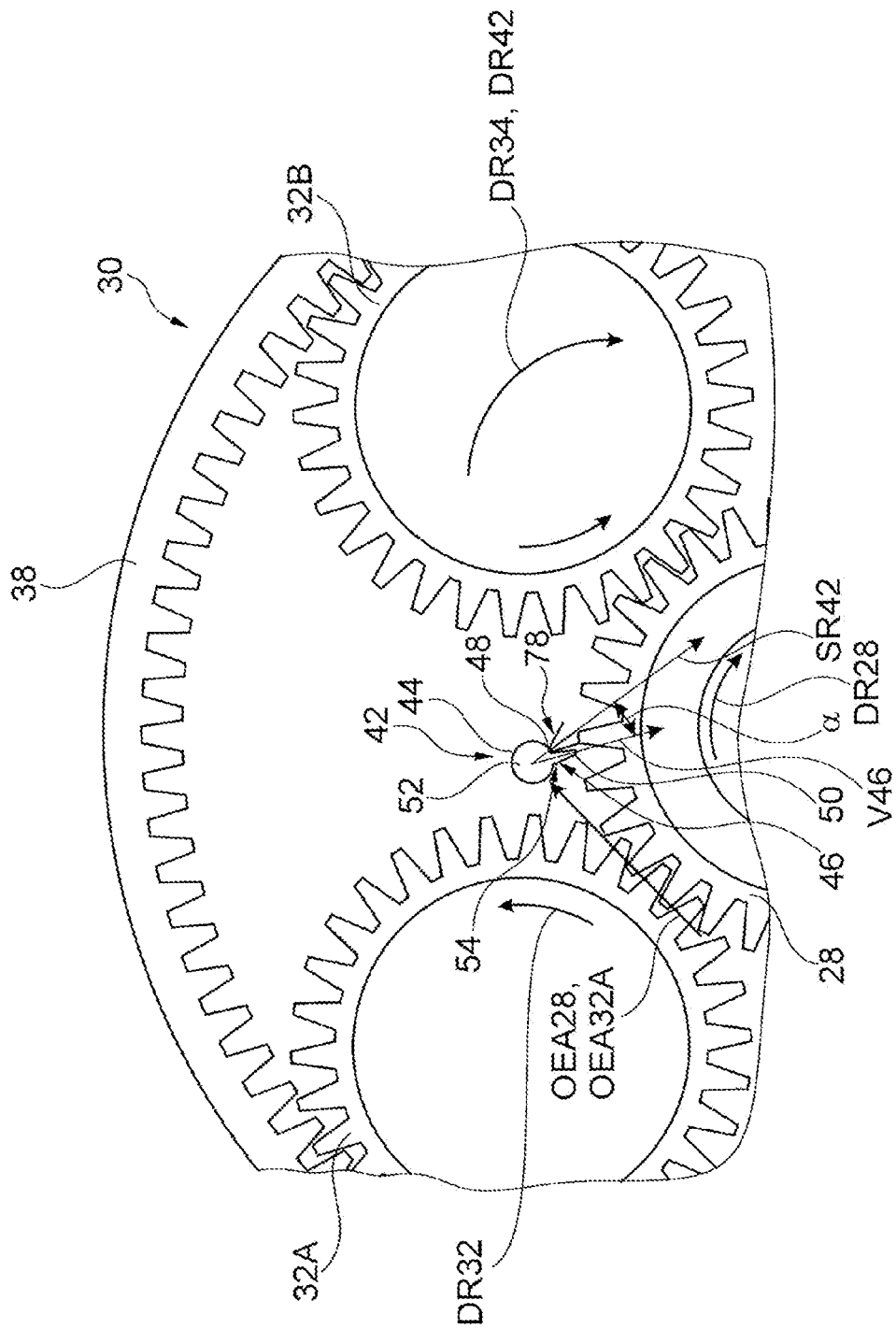

FIG. 4 shows an enlarged view of a region IV of the planetary gearbox 30 which is identified in more detail in FIG. 3 and which comprises an oil supply installation 42 by way of which the sun gear 28 in the manner described in more detail hereunder is capable of being impinged with oil for cooling and lubricating. To this end, a shielding region 46 which protrudes from an external side 44 of the oil supply installation 42 in relation to a primary rotating direction DR28 of the sun gear 28 is disposed in front of an opening 48 of the oil supply installation 42. An outflow direction SR42 of the oil 78 from the opening 48 is directed so as to be at least approximately radial onto the sun gear 28.

Additionally, the opening 48 and a profile V46 of the shielding region 46, proceeding from the external side 44 of the oil supply installation 42 in the direction of a free end 50 of the shielding region 46, are mutually adapted such that the outflow direction SR42 of the oil 78 from the opening 48 and the profile V46 of the shielding region 46 mutually enclose an acute angle $\alpha$.

In the case of the exemplary embodiment of the planetary gearbox 30 illustrated in FIG. 4, the tooth profile of the sun gear 28 before the engagement of the teeth with the planetary gear 32B that follows in the rotating direction DR28 is impinged with oil for lubricating and cooling that emanates from the oil supply installation 42.

Figure 14:
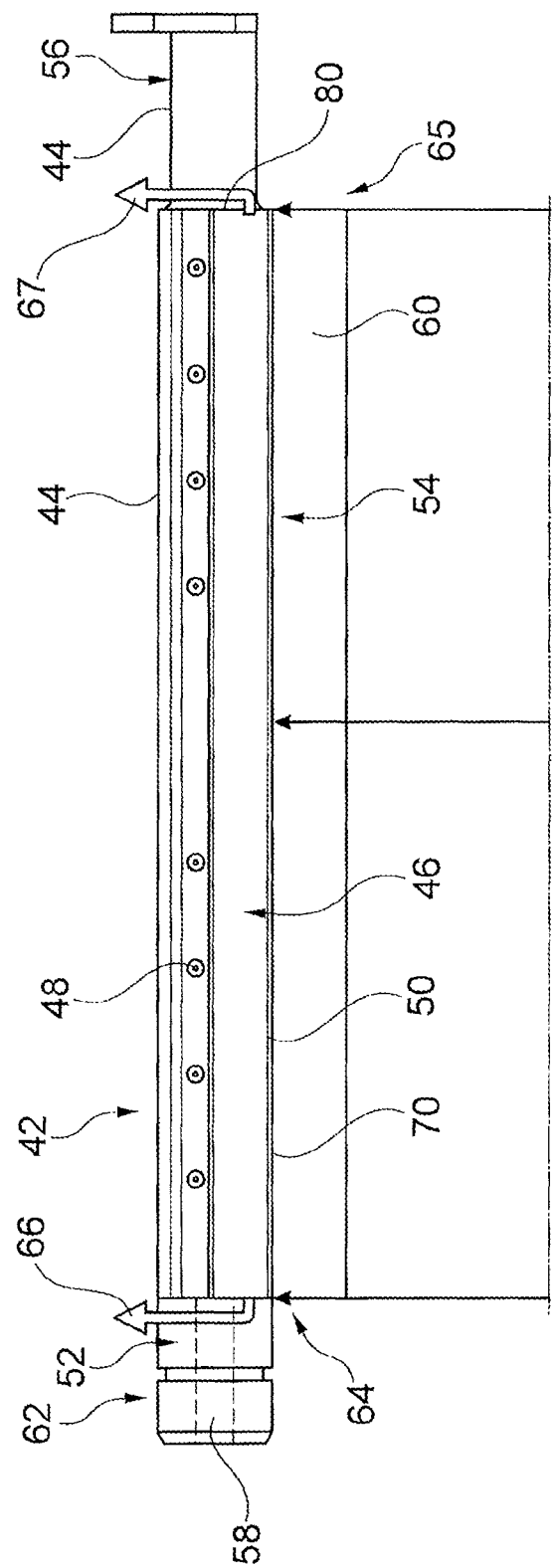
FIG. 14 to FIG. 17 show in each case a lateral view of further embodiments of an oil supply installation.

Additionally, the oil which is ejected from the planetary gear 32A, or from the sun gear 28, in a substantially tangential manner in the oil splashing direction OEA32A, or OEA28, respectively, is collected by the shielding region 46 and by a main body 52 of the oil supply installation 42 and is collected in an oil collection groove 54 that is formed by the main body 52 and the shielding region 46. The oil collected and accumulated in the oil collection groove 54 is directed in the axial direction to end regions 64, 65 that are illustrated in FIG. 14 of the oil collection groove 54 of the oil supply installation 42, and from there flows in the direction of the planet carrier 34, the rotating direction DR34 of the latter being identical to the rotating direction DR42 of the oil supply installation 42 which is connected to said planet carrier 34.

Figure 5:
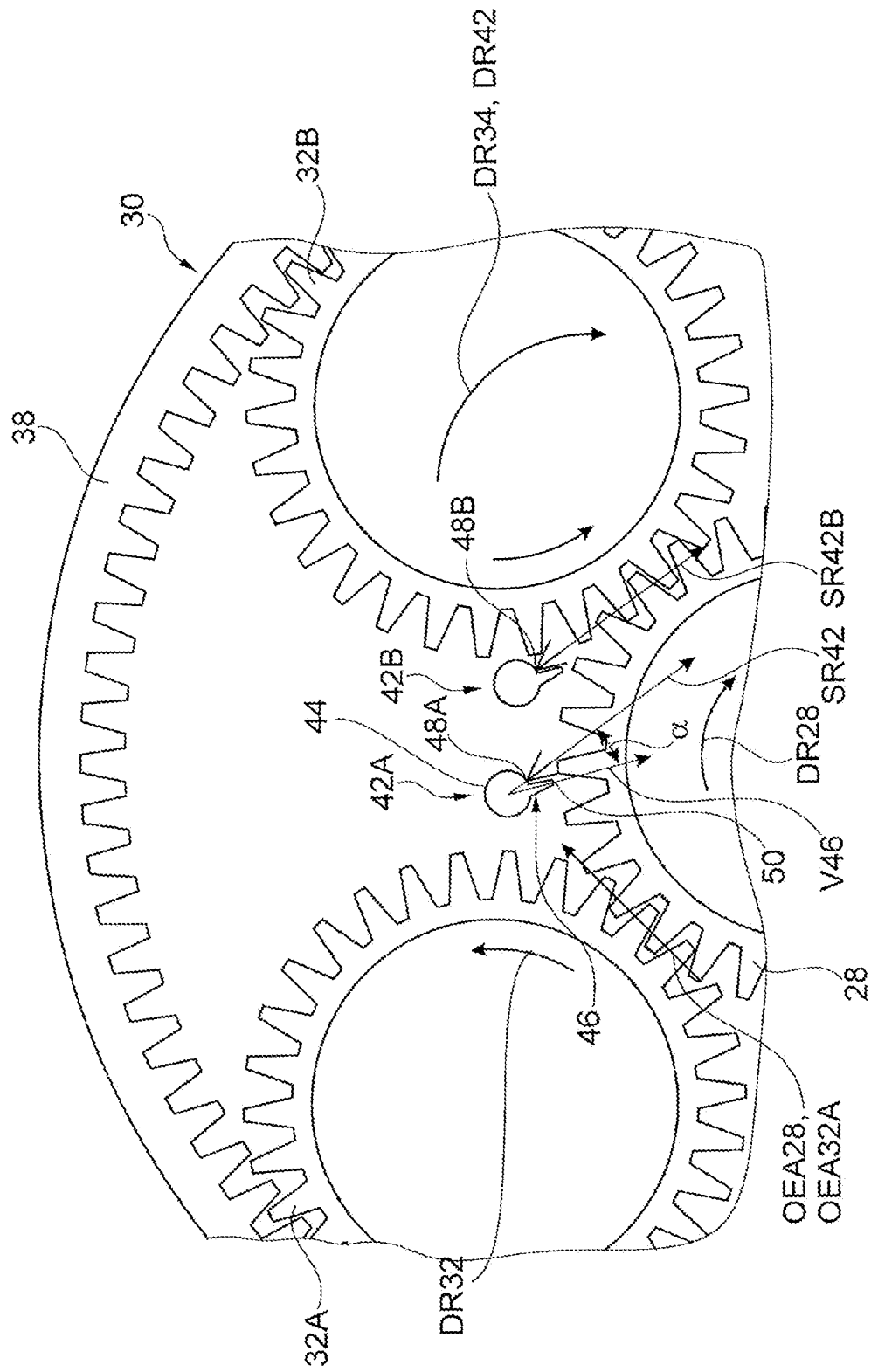

FIG. 5 shows the region IV of a further exemplary embodiment of the planetary gearbox 30, wherein two oil supply installations 42A and 42B are disposed in the region IV. The two oil supply installations 42A and 42B are of a substantially identical construction to the oil supply installation 42 according to FIG. 4. The oil supply installation 42A herein is disposed substantially at the same position within the planetary gearbox 30 as the oil supply installation 42 of the planetary gearbox 30 according to FIG. 4. The further oil supply installation 42B of the planetary gearbox 30 according to FIG. 5 in the primary rotating direction DR28 of the sun gear 28 is disposed so as to be closer to the tooth engagement between the sun gear 28 and the planetary gear 32B. Furthermore, an outflow direction SR42B of the oil 78 from an opening 48B of the further oil supply installation 42B runs so as to be substantially tangential to the sun gear 28 and to the planetary gear 32B. It is thus achieved in a simple manner in terms of construction that both the sun gear 28 and the planetary gear 32B are capable of being impinged with oil by way of the oil supply installation 42B.

Figure 6:
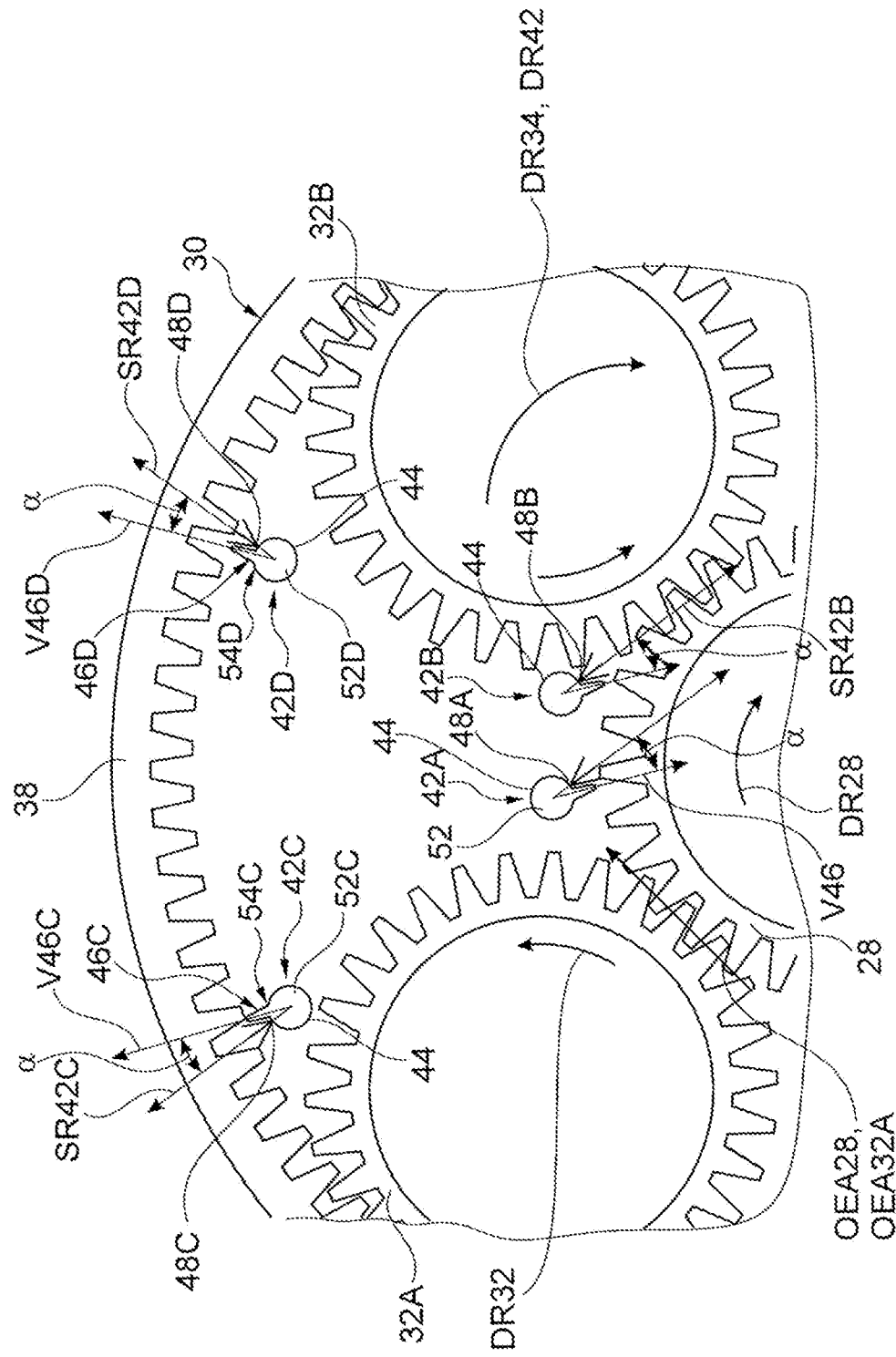

FIG. 6 shows the region IV of a planetary gearbox 30 which is a refinement of the planetary gearbox 30 illustrated in FIG. 5. Like the planetary gearbox 30 according to FIG. 5, the planetary gearbox 30 according to FIG. 6 comprises the two oil supply installations 42A and 42B and additionally two further oil supply installations 42C and 42D, the outflow directions SR42C and SR42D, respectively, of the latter being directed so as to be substantially radial onto the ring gear 38. The additional oil supply installations 42C and 42D are of a substantially identical construction to the oil supply installations 42A and 42B. Shielding regions 46C and 46D of the additional oil supply installations 42C and 42D are in each case disposed so as to run between tooth engagements between the ring gear 38 and the planetary gears 32A and 32B and sides of the oil jets from the openings 48C and 48D that face said tooth engagements, and with the main body 52C and 52D delimit in each case one oil collection groove 54C and 54D. Additionally, profiles V46C and V46D of the shielding regions 46C and 46D are at least approximately parallel to the outflow directions SR42C and SR42D, respectively, from the openings 42C and 42D, or with said outflow directions SR42C and SR42D, respectively, enclose in each case a minor acute angle α.

Figure 7:
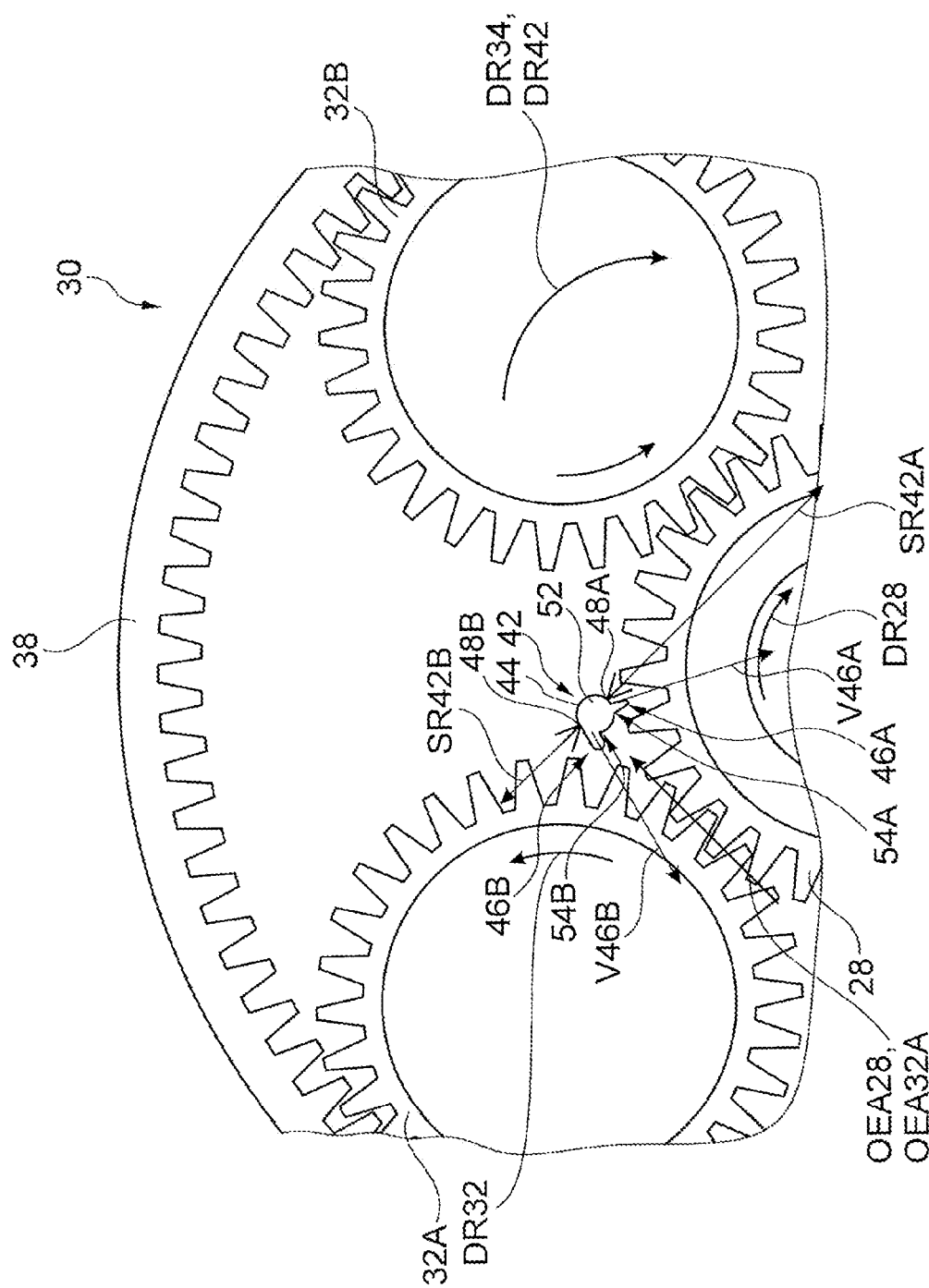

The planetary gearbox 30 according to FIG. 7 in the region IV is configured only having one oil supply installation 42 by way of which the tooth profile of the sun gear 28 and the tooth profile of the planetary gear 32A are capable of being simultaneously impinged with oil 78. To this end, the oil supply installation 42 comprises openings 48A and 48B which are in each case mutually spaced apart in the circumferential direction of the main body 52. The tooth profile of the sun gear 28 herein is impinged with oil by way of a plurality of openings 48A which are mutually spaced apart in the axial direction, and the tooth profile of the planetary gear 32A is impinged with oil by way of the openings 48B which are mutually spaced apart in the axial direction. The outflow direction SR42A of the oil in the direction of the sun gear 28 is aligned so as to be substantially parallel to the profile V46A of the first shielding region 46A. As opposed thereto, the outflow direction SR42B from the openings 48B, with the profile V46B of the second shielding region 46B, encloses an acute angle which is close to 90°. The two shielding regions 46A and 46B in turn, with the main body 52 of the oil supply installation 42, delimit in each case one oil collection groove 54A and 54B in which the oil splashing from the sun gear 28 and from the planetary gear 32A is collected and directed away in the axial direction of the main body 52 of the oil supply installation 42.

Figure 8:
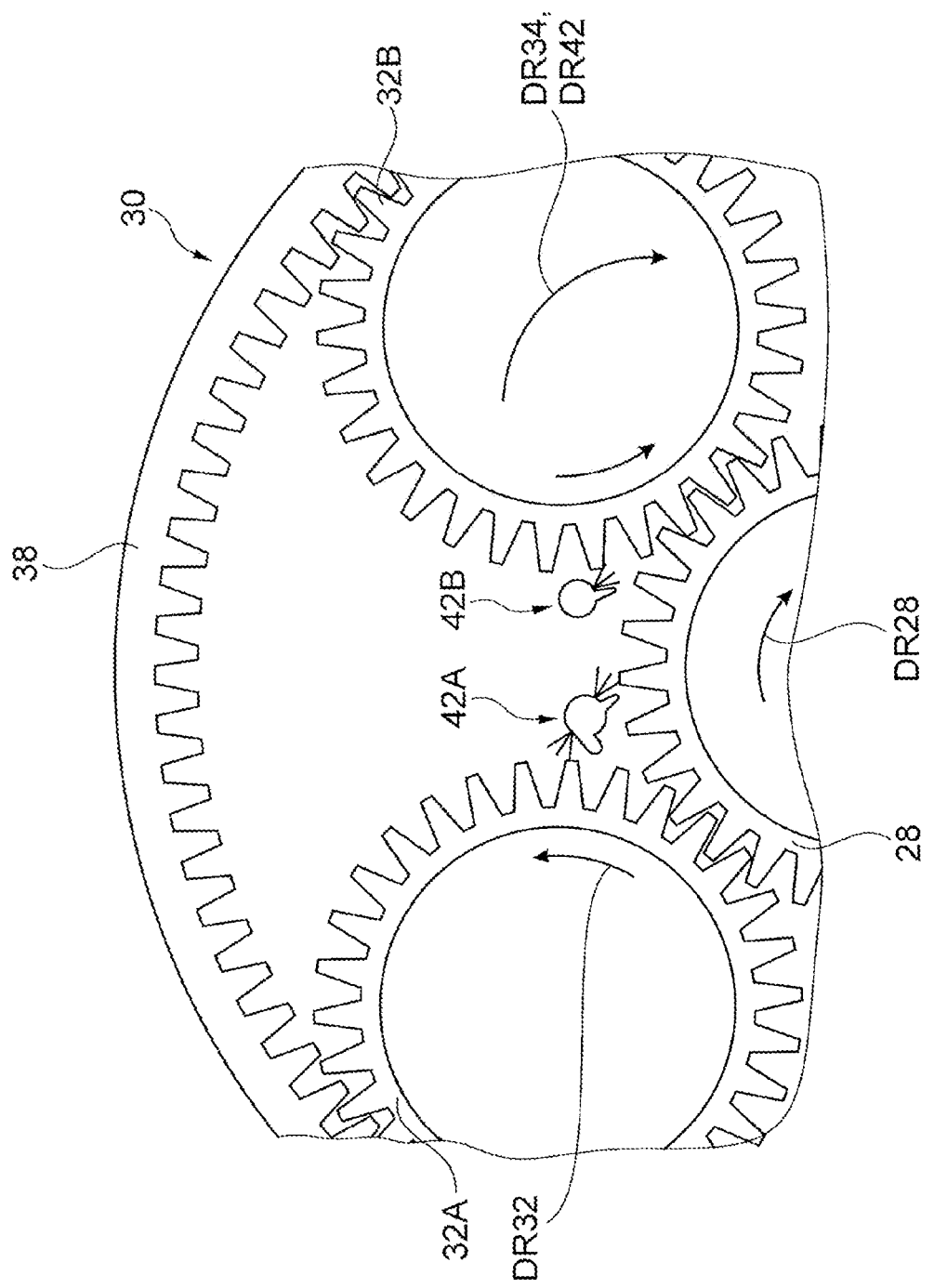

FIG. 8 shows a further exemplary embodiment of the planetary gearbox 30 which in the region IV close to the tooth engagement between the sun gear 28 and the two planetary gears 32A and 32B is in each case configured having one oil supply installation 42A and 42B. The oil supply installation 42A of the planetary gearbox 30 according to FIG. 8 herein corresponds to the oil supply installation 42A of the planetary gearbox according to FIG. 7, and the oil supply installation 42B of the planetary gearbox 30 according to FIG. 8 corresponds to the oil supply installation 42B of the planetary gearbox 30 according to FIG. 5.

Additionally, FIG. 9 shows the region IV of a planetary gearbox 30 which represents a refinement of the planetary gearbox 30 according to FIG. 8 and which, besides the two oil supply installations 42A and 42B, is configured having two further oil supply installations 42C and 42D. The two oil supply installations 42C and 42D are of a substantially identical construction. Both the tooth profile of the planetary gear 32A and the tooth profile of the ring gear 38 herein are capable of being impinged with oil by way of the oil supply installation 42C. As a point of difference thereto, both the tooth profile of the planetary gear 32B and the tooth profile of the ring gear 38 herein are impinged with oil by way of the oil supply installation 42D. In order for the impingement of the gears 32A and 32B as well as of the ring gear 38 to be able to be ensured by way of the oil supply installations 42C and 42D, the oil supply installations 42C and 42D comprise in each case two shielding regions 46C1 and 46C2, and 46D1 and 46D2, respectively. By way of the shielding regions 46C1 and 46C2, and 46D1 and 46D2, respectively, the oil jets that exit from openings 48C1 and 48C2, and 48D1 and 48D2, respectively, of the oil supply installations 42C and 42D, respectively, in the outflow directions SR42C1, SR42C2, and SR42D1, SR42D2, respectively, are not compromised by the oil that splashes in each case from the planetary gears 42A and 42B, respectively, and from the ring gear 38. The outflow directions SR42C1 to SR42D2, with the profiles V46C1 to V46D2 of the shielding installations 46C1 to 46D2 of the oil supply installations 42C and 42D, herein enclose in each case an acute angle α.

Additionally, FIGS. 10 to 13 show further schematic individual illustrations of different exemplary embodiments of oil supply installations 42 in a lateral view.

Figure 10:
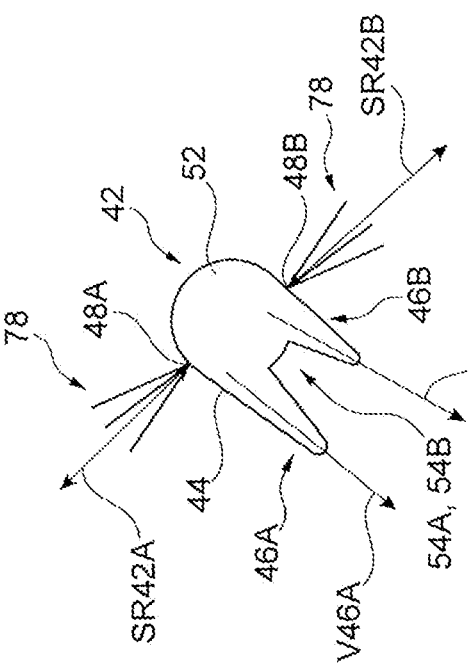

Oil 78 from the oil supply installation 42 according to FIG. 10 herein is capable of being directed from openings 48A, 48B from the main body 52 in two outflow directions SR42A and SR42B which substantially mutually enclose an angle of approximately 180°. Furthermore, the outflow direction SR42A, with a profile V46A of the first shielding region 46A, encloses an obtuse angle, while the outflow direction SR42B, with the profile V46B of the second shielding region 46B, in turn encloses an acute angle. Additionally, the profiles V46A and V46B of the shielding regions 46A and 46B are aligned so as to be at least approximately mutually parallel and, conjointly with the main body 52 of the oil supply installation 42, delimit in each case one oil collection groove 54A and 54B, respectively, in which oil splashing in each case from the sun gear 28, from the planetary gear 32A, or from the ring gear 38, to the desired extent is capable of being collected, accumulated and directed away in a targeted manner.

Figure 11:
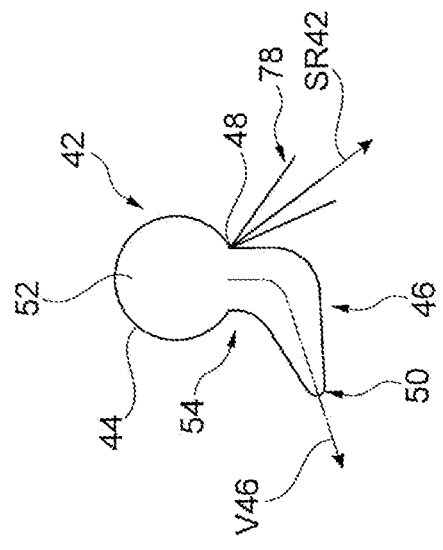
FIG. 10 to FIG. 13 show in each case a schematic lateral view of different embodiments of an oil supply installation of a planetary gearbox.
Figure 12:
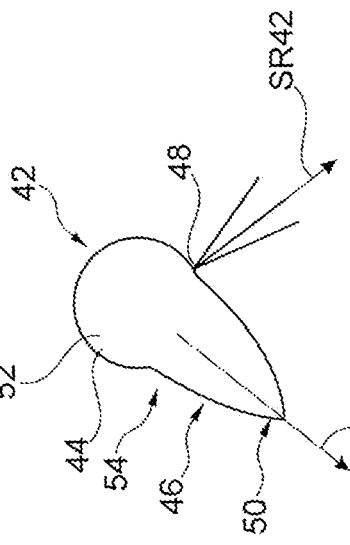
Figure 13:
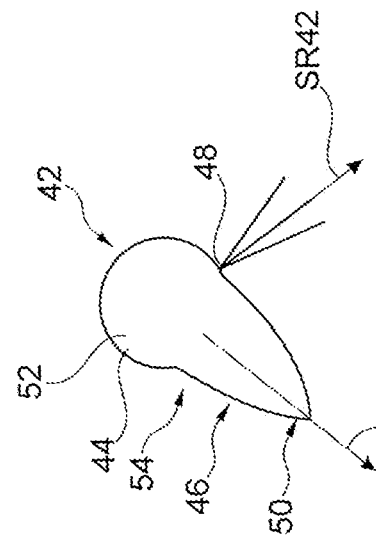

As opposed to the oil supply installation 42 according to FIG. 10, the oil supply installations 42 according to FIG. 11 to FIG. 13 are embodied only having openings 48 and one shielding region 46. By way of the openings 48, oil from the main body 52 is capable of being directed only in one outflow direction SR42.

The oil supply installations 42 according to FIG. 11 to FIG. 13 differ from one another in each case substantially only in terms of the design embodiment of the shielding region 46. The shielding region 46 of the oil supply installation 42 according to FIG. 11 herein, proceeding from the main body 52, is configured so as to be curved in the direction of the free end 50 of said main body 52 and has a larger wall thickness than the shielding region 46 of the oil supply installation according to FIG. 12.

The curvature of the profile V46 of the shielding region 46 of the oil supply installation 42 according to FIG. 11 herein is in such a manner that the profile V46, with the outflow direction SR42 of the oil, initially encloses an acute angle. As the spacing from the main body 52 increases, the angle between the outflow direction SR42 and the profile V46 increases until said two profile mutually enclose an obtuse angle.

Additionally, the profile V46 of the shielding region of the oil supply installation 42 according to FIG. 12, proceeding from the main body 52, is likewise embodied so as to be bent or curved, respectively, in the direction of the free end 50 of said main body 52. The curvature of the profile V46 of the shielding region 46 of the oil supply installation 42 according to FIG. 12 in turn is in such a manner that the profile V46 proceeding from the main body 52, with the outflow direction SR42, initially at least approximately encloses a right angle. As the spacing increases, the angle between the profile V46 of the shielding region 46 and the outflow direction SR42 increases to the extent illustrated.

As opposed thereto, the shielding region 46 of the oil supply installation 42 according to FIG. 13 has a straight or linear, respectively, profile V46. The wall thickness of the shielding region 46 of the oil supply installation 42 according to FIG. 13 in the linking region to the main body 52 corresponds substantially to the diameter of the main body 52. As the spacing from the main body 52 increases, the wall thickness of the shielding region 46 steadily decreases, wherein the shielding region 46 in the cross section is configured so as to be at least approximately triangular.

FIG. 14 to FIG. 17 show in each case a lateral view of further embodiments of the oil supply installation 42. The main body 52 of the oil supply installations 42 according to FIG. 14 to FIG. 17 herein comprises in each case one cylindrical region 56 in which one supply line 58 for oil is in each case provided, oil being capable of being guided by way of said supply line 58 to the openings 48 which are mutually spaced apart in the axial direction of the oil supply installation 42. Besides the shielding regions 46, a region 60 of the main bodies 52 that in the cross section is at least triangular presently protrudes in each case from the external sides 44, said regions 60 with the shielding regions 46 in each case delimiting the oil collection grooves 54.

In the assembled state of the planetary gearbox 30, oil from an end region 62 of the oil supply installations 42 is directed in each case by way of a rotary supply (not illustrated in more detail) into the supply lines 58, and to the extent described above is directed from the openings 48 of the main bodies 52 by way of defined outflow directions SR42 in the direction of the sun gears 28, in the direction of the planetary gears 32A to 32D, and/or in the direction of the ring gears 38.

The oil collection groove 54 of the oil supply installation 42 according to FIG. 14 between two end regions 64 and 65 has a consistent depth between the free end 50 of the shielding region 46 and a base 80 of the oil collection groove 54. The oil which in each case splashes from the sun gear 28, the planetary gears 32A to 32D, and/or from the ring gear 38 and which is collected and accumulated in the oil collection groove 54, in the case of a correspondingly horizontal alignment of the main body 52, in substantially equal measures thus flows radially outward by way of the end regions 64 and 65. The flow direction of the oil flowing from the oil collection groove 54 in the end regions 64 and 65 is in each case identified in more detail by the arrows 66 and 67 in FIG. 14. The outflow of the oil from the oil collection groove 54 in the flow directions 66 and 67 herein is facilitated in the desired manner when the oil supply installation 42 that is fixedly connected to the planet carrier 34 rotates. Specifically, the oil in this instance is imparted a corresponding impulse by the centrifugal force acting on the oil.

Figure 15:
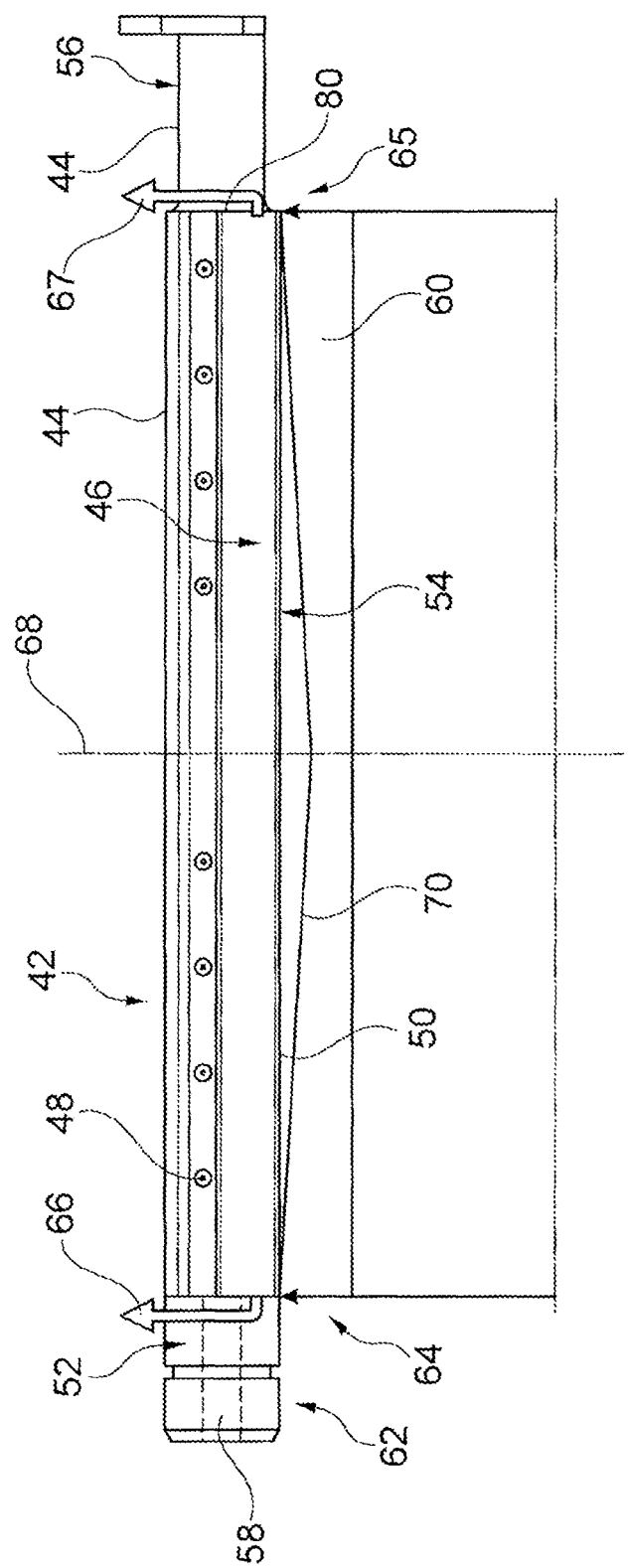

In the case of the exemplary embodiment of the oil supply installation 42 illustrated in FIG. 15, the depth of the oil collection groove 54, proceeding from a center 68 between the two end regions 64 and 65, decreases in the direction of the end regions 64 and 65 in a manner corresponding to the line 70 illustrated in FIG. 15. On account thereof, it is again achieved in a simple manner that oil accumulated in the oil collection groove 54, proceeding from the center 68, is guided in the direction of the end region 64 or in the direction of the end region 65 and flows out of the oil collection groove 54 in the flow direction 66 or 67, respectively.

Figure 16:
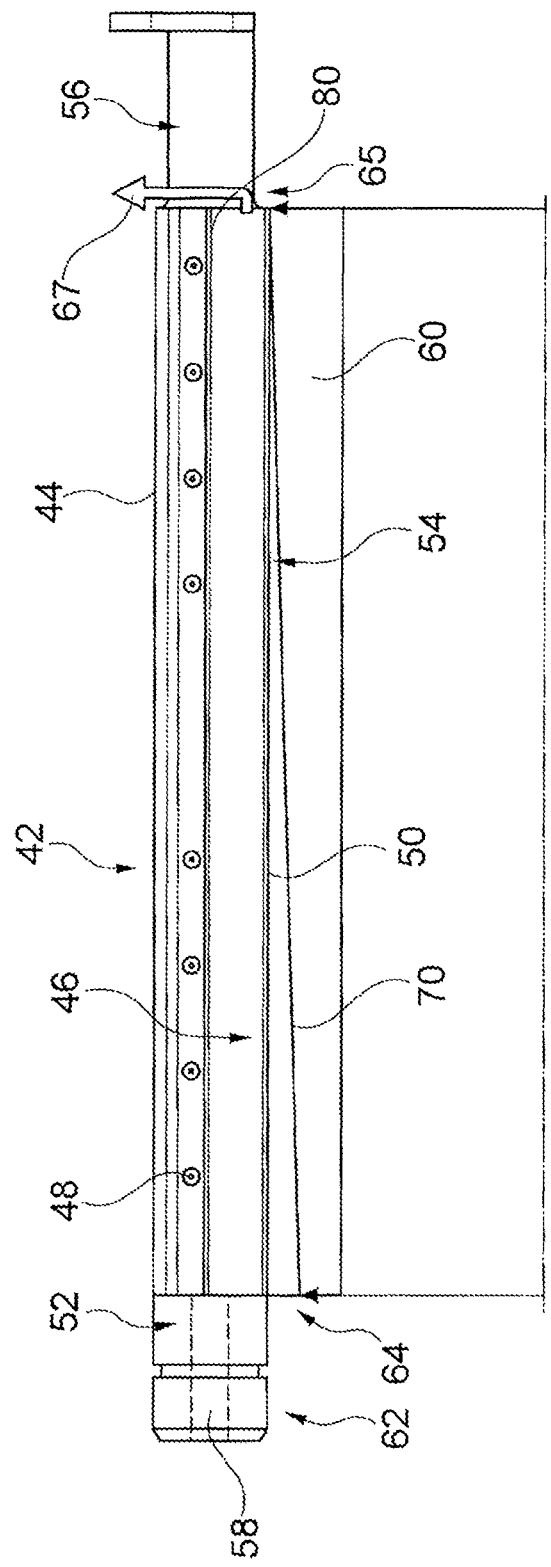

In the case of the exemplary embodiment of the oil supply installation 42 illustrated in FIG. 16, the depth of the oil collection groove 54, proceeding from the end region 65, steadily decreases in the direction of the first end region 64 in a manner corresponding to the line 70. It is thus achieved that the oil that is directed into the oil collection groove 54 flows out of the oil collection groove 54 in the flow direction 67 largely in the end region 65.

Figure 17:
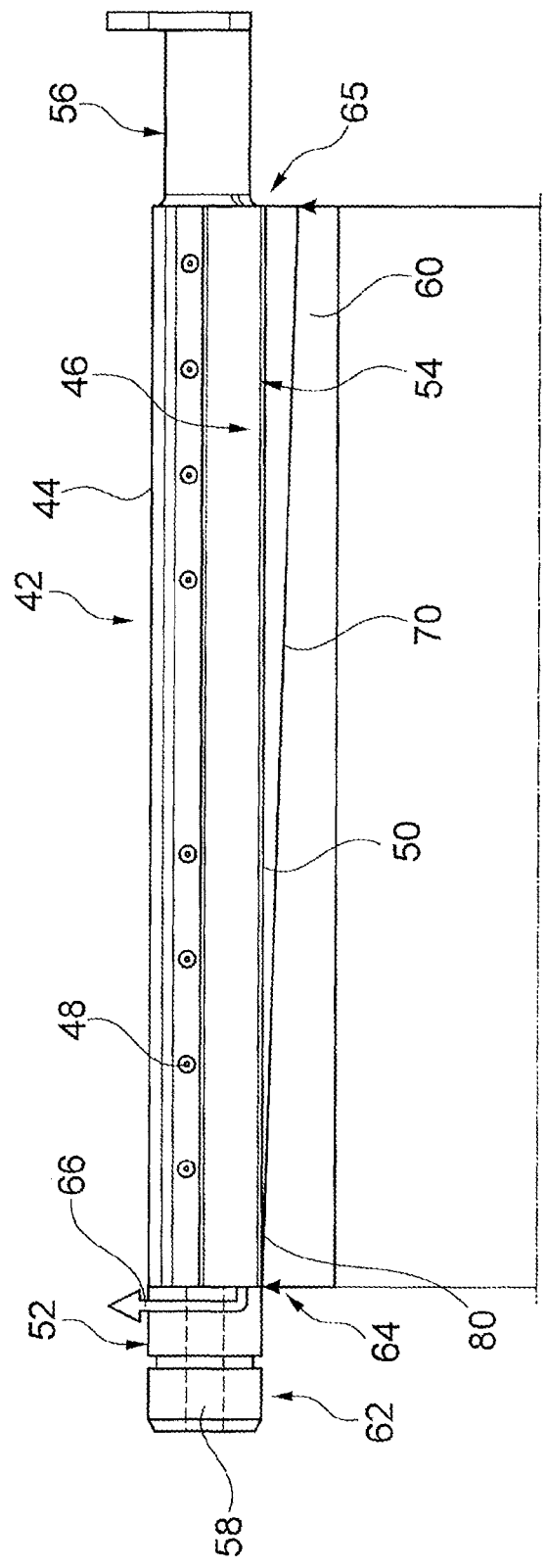

As opposed thereto, in the case of the exemplary embodiment of the oil supply installation 42 illustrated in FIG. 17, the depth of the oil collection groove 54, proceeding from the end region 65, steadily increases in the direction of the end region 64 in a manner corresponding to the line 70, the oil that is collected and accumulated in the oil collection groove 54 thus flowing out of the oil collection groove 54 in the flow direction 66 largely in the first end region 64.

FIG. 18 shows a three-dimensional individual view of a further embodiment of the oil supply installation 42. The oil supply installation 42 is configured having two shielding regions 46A and 46B by way of which openings 48A and 48B are capable of being shielded. Mutually facing end regions 65A and 64B of the shielding regions 46A and 46B are mutually spaced apart in the axial direction and delimit a central outlet region 72 of the oil supply installation 42. The two shielding regions 46A and 46B, with the external side 44 of the main body 52, additionally delimit in each case one oil collection groove 54A and 54B. The oil supply installation 42 presently is constructed so as to be substantially symmetrical between end regions 64A and 65B of the two oil collection grooves 54A and 54B, or the shielding regions 46A, 46B, respectively. Furthermore, the two oil collection grooves 54A and 54B, in the axial direction between the end regions 64A and 65A thereof, or 64B and 65B, respectively, have in each case a consistent depth. The profile of a base or groove base 80, respectively, of the oil collection grooves 54A and 54B is again graphically represented by the line 70 illustrated in FIG. 19. The oil 78 that is in each case directed into the oil collection grooves 54A and 54B, in the case of a correspondingly horizontal alignment of the oil supply installation 42, in substantially equal measures is directed out of the oil collection grooves 54A and 54B by way of the end regions 64A and 65A, or 64B and 65B, respectively, in a manner corresponding to the flow directions 66A and 67A, or 66B and 67B, respectively.

The embodiment of the oil supply installation 42 having divided oil collection grooves 54A and 54B which are mutually spaced apart in the axial direction is provided, for example, when the tooth region of the sun gear 28, the planetary gears 32A to 32D, and/or the ring gear 38 is divided and a so-called gear groove is in each case present between the two tooth regions.

The oil that streams in each case from the oil collection groove 54 or the oil collection grooves 54A and 54B flows in the direction of the planet carrier 34, or to the planet carrier 34 and to the central gear groove. From there, the oil from the rotating system to a defined extent flows from the sun gear 28, the planetary gears 32A to 32D, and from the ring gear 38 in the direction of static casing parts of the planetary gearbox 30 and is there suctioned in a directed manner, for example.

Figure 20:
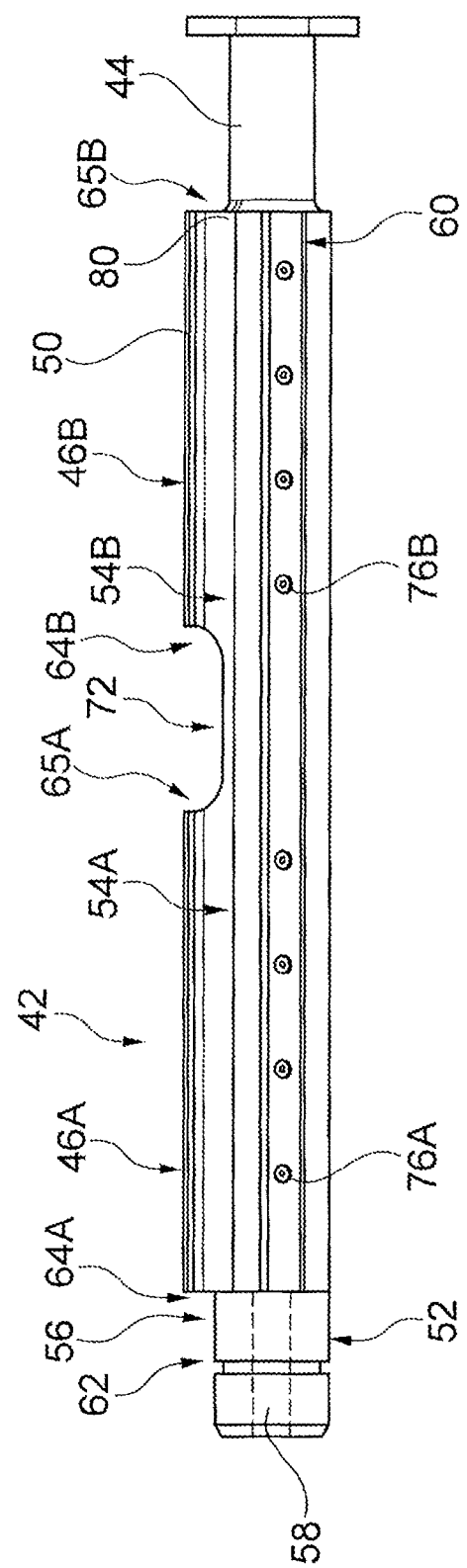
FIG. 20 shows the oil supply installation according to FIG. 19 from a view XX as identified in more detail in FIG. 19.

FIG. 20 shows the oil supply installation 42 according to FIG. 18 in a view XX that is identified in more detail in FIG. 18. It can be derived from the illustration according to FIG. 20 that the oil supply installation 42 beside the openings 48A and 48B has further openings 76A and 76B in the region of a free end 74 of the triangular region 60, oil from the supply line 58 being capable of being directed away from said further openings 76A and 76B in a defined manner.

Figure 21:
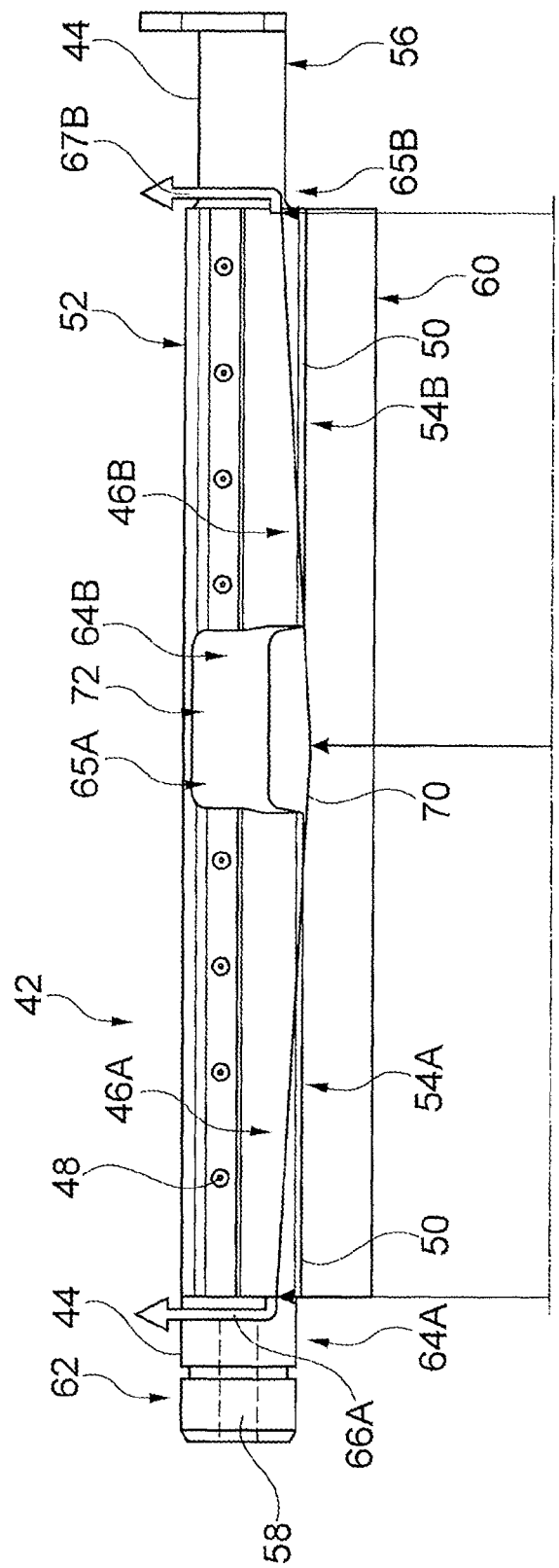
FIG. 21 shows an illustration corresponding to that of FIG. 19 of a further exemplary embodiment of the oil supply installation.

FIG. 21 shows an illustration corresponding to FIG. 19 of a further exemplary embodiment of the oil supply installation 42 which corresponds substantially to the embodiment shown in FIG. 18 to FIG. 20. The substantial difference between said two exemplary embodiments of the oil supply installation 42 lies in the profile of the base 80 of the two oil collection grooves 54A and 54B, said profile, proceeding from a center 82 between the end regions 64A and 65B of the two oil collection grooves 54A and 54B, steadily increasing in each case in the direction of the end regions 64A and

65B. On account thereof, it is again achieved that oil that is directed into the oil collection grooves 54A and 54B flows out of the oil collection grooves 54A and 54B by way of the end regions 64A and 65B in the flow directions 66A and 67B, respectively. Only the oil that between the two oil collection grooves 54A and 54B splashes from the sun gear 28, from one of the planetary gears 32A to 32B, and/or from the ring gear 38 flows radially through the central outlet region 72.

Figure 22:
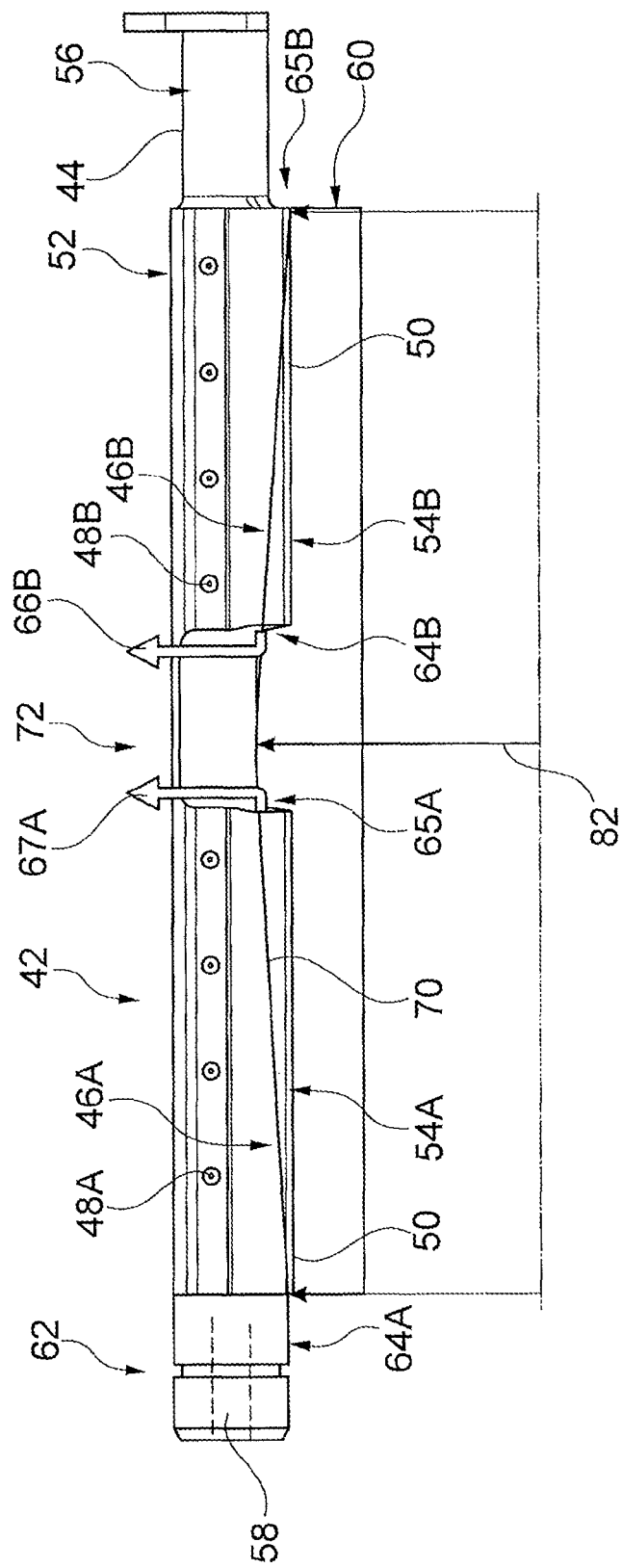
FIG. 22 shows an illustration corresponding to that of FIG. 19 of a further embodiment of the oil supply installation.

In the case of the exemplary embodiment of the oil supply installation 42 which is illustrated in FIG. 22 and which in turn corresponds substantially to the exemplary embodiment of the oil supply installation 42 shown in FIG. 18, the depth of the oil collection grooves 54A and 54B, proceeding from the central outlet region 72, steadily decreases in the direction of the end regions 64A and 65B in a manner corresponding to the line 70. By way of this embodiment of the oil collection grooves 54A and 54B it is again achieved in a simple manner in terms of construction that the oil that is directed into the oil collection grooves 54A and 54B by way of the end regions 64B and 65A is directed radially outward in the flow directions 66B and 67A by way of the central outlet region 72.

Figure 24:
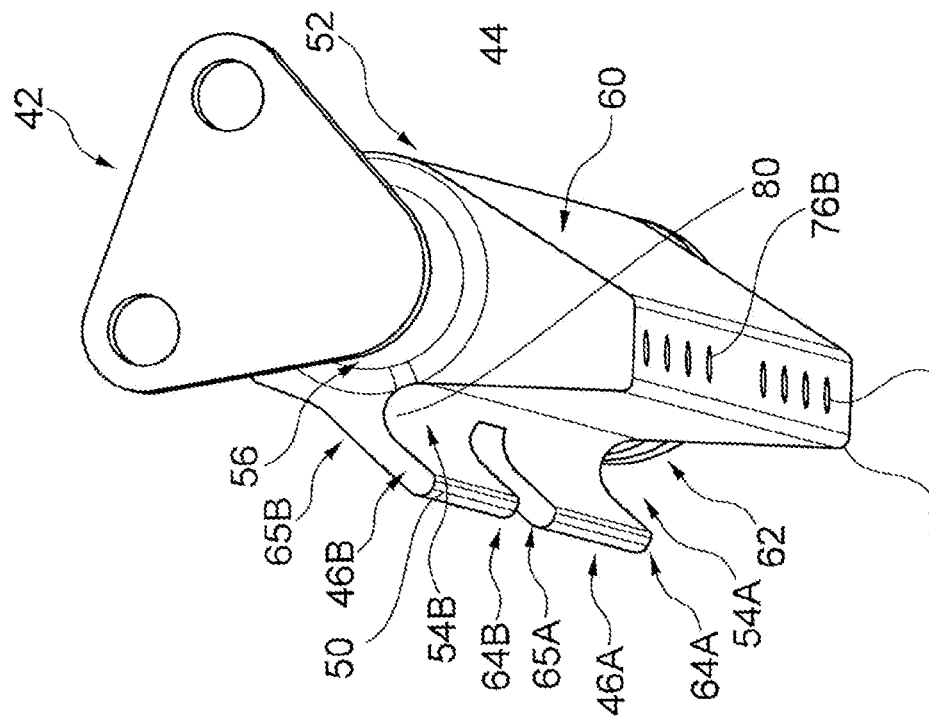
FIG. 24 shows a three-dimensional illustration of the oil supply installation according to FIG. 23.
Figure 23:
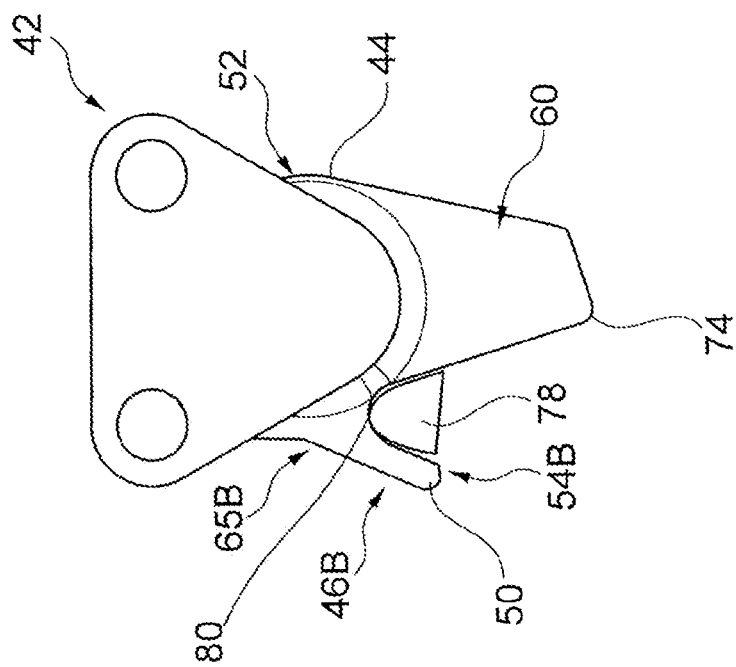
FIG. 23 shows a lateral view of a further embodiment of the oil supply installation.

FIG. 23 shows a lateral view of a further embodiment of the oil supply installation 42 in a view XXIII which is identified in more detail in FIG. 18, wherein the oil supply installation 42 corresponds substantially to the oil supply installation 42 according to FIG. 18. Additionally, FIG. 24 shows a three-dimensional lower view of the oil supply installation 42 according to FIG. 23.

Figure 25:
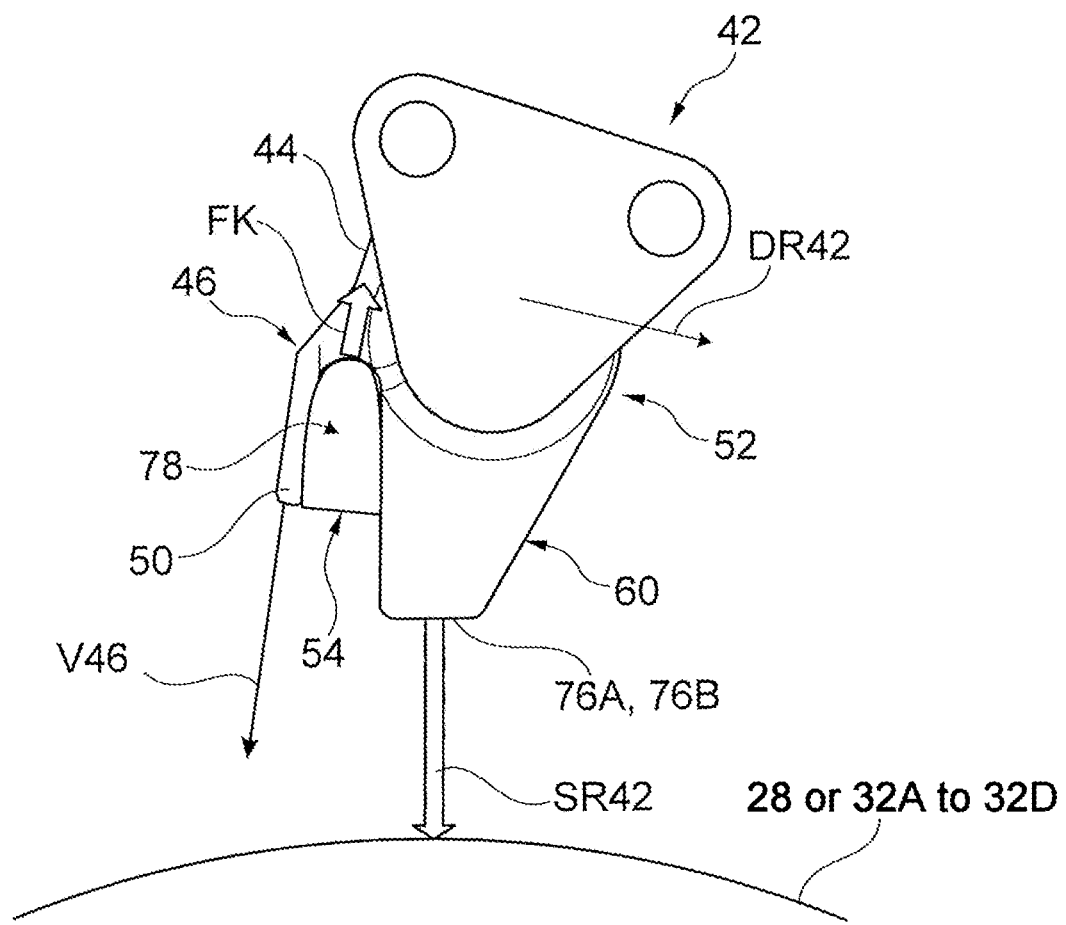
FIG. 25 shows a lateral view of a further embodiment of the oil supply installation.

FIG. 25 shows a lateral view of a further embodiment of the oil supply installation 42, in which the profile V46 of the shielding region 46 and an outflow direction SR42 of the oil from the openings 76A, 76B are substantially mutually parallel, and the outflow direction SR42 of the oil runs so as to be substantially radial to the crown circle of the sun gear 28 or to a crown circle of the planetary gears 32A to 32D. The shielding region 46 herein protrudes in relation to the external side 44 of the oil supply installation 42 in such a manner that the centrifugal force FK acts in the rotating direction DR42 on the oil 78 accumulated in the oil collection groove 54 that in the case of a rotating planet carrier 34 guides the oil 78 in the direction of the base 80 of the oil collection groove 54.

Figure 26:
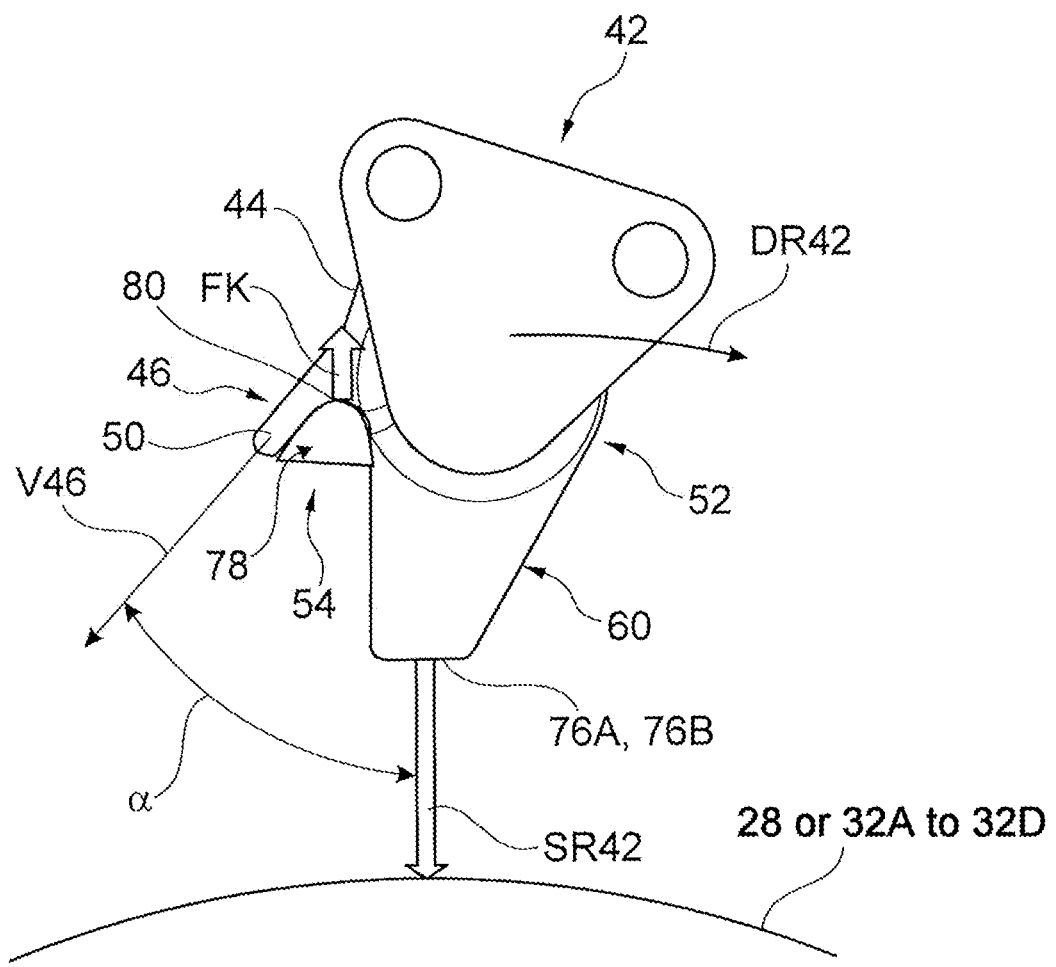
FIG. 26 shows an illustration corresponding to that of FIG. 25 of a further embodiment of the oil supply installation.

FIG. 26 shows a further lateral view of a further exemplary embodiment of the oil supply installation 42, again in the view XXIII. The oil supply installation 42 differs substantially from the exemplary embodiment of the oil supply installation 42 illustrated in FIG. 25 in that the outflow direction SR42 of the oil from the openings 76A, 76B and the profile V46 of the shielding region 46 mutually enclose an acute angle α.

Figure 27:
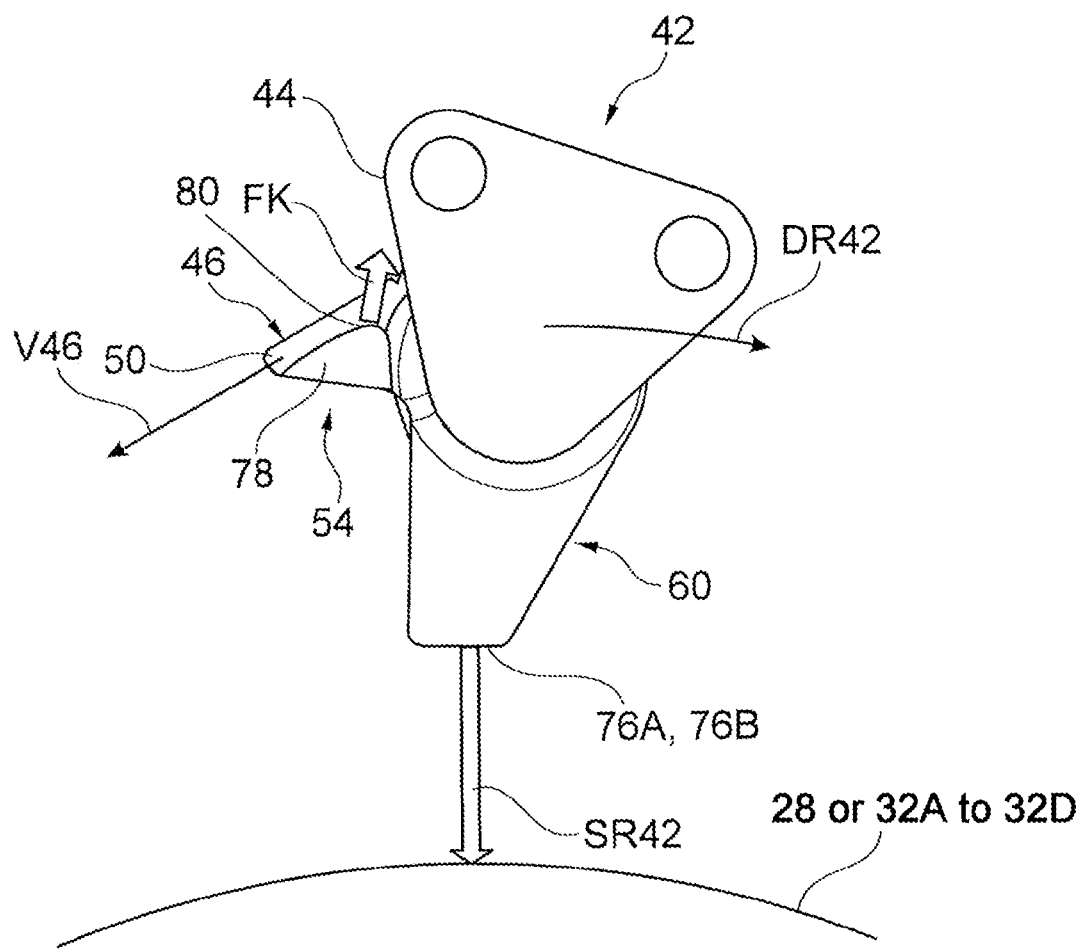
FIG. 27 shows an illustration corresponding to that of FIG. 25 of a further embodiment of the oil supply installation.

A further exemplary embodiment of the oil supply installation 42 in the view XXIII is additionally illustrated in FIG. 27, in which the profile V46 of the shielding region 46 and the outflow direction SR42 of the oil from the openings 76A, 76B mutually enclose an angle which, depending on the respective specific application, corresponds to up to 90°.

Figure 28:
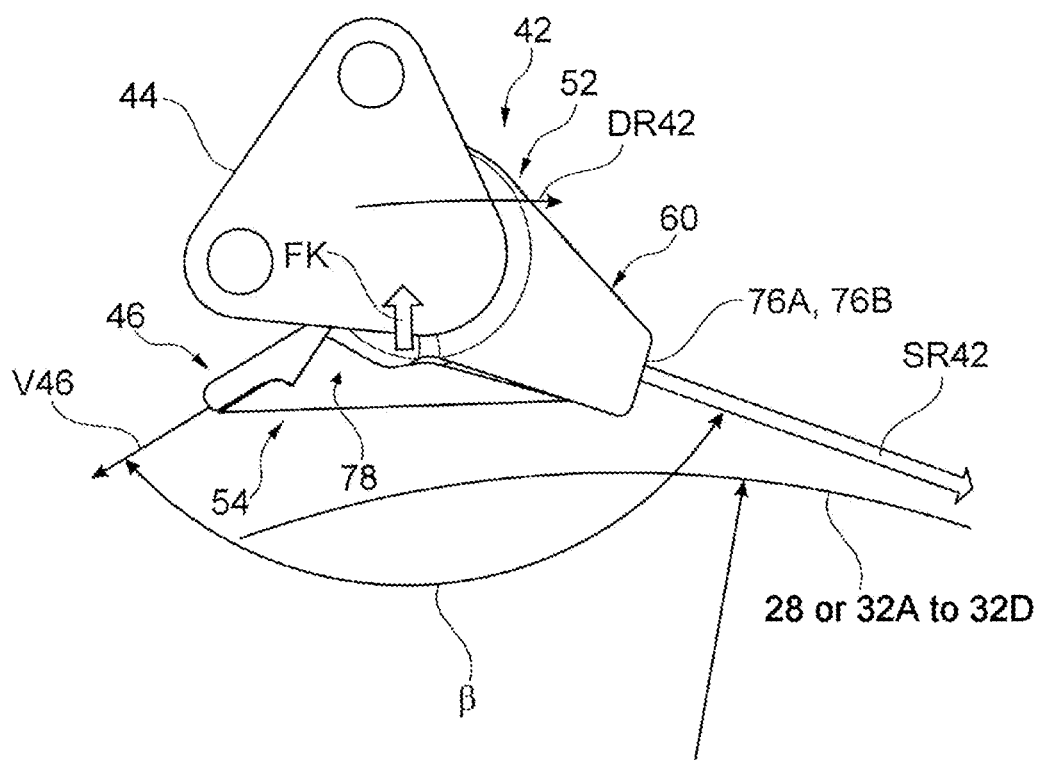
FIG. 28 shows an illustration corresponding to that of FIG. 25 of a further embodiment of the oil supply installation.

FIG. 28 shows a further exemplary embodiment of the oil supply installation 42 in an illustration corresponding to that of FIG. 23, in which the outflow direction SR42 from the openings 76A, 76B runs so as to be substantially tangential to the crown circle of the sun gear 28, or to a crown circle of the planetary gears 32A to 32D, respectively, and with the profile V46 of the shielding region 46 encloses an obtuse angle β.

In principle, an oil supply installation presently represents an oil protection device. Such an oil protection device protects the lubricating and cooling oil jets from oil that is ejected from gears or other components of a gearbox. Said ejected oil can interfere with or destroy, respectively, the lubricating and cooling oil jets from the oil supply installation, or from so-called spray bars, respectively. In order to be able to guarantee desired cooling or lubricating of a gear of a planetary gearbox, or in order for all of the gear flanks, in particular those of the sun gear, to be able to be wetted, respectively, an undisturbed concentrated oil jet from the oil supply installation is to be guided, or is required, respectively, in the direction of the gear or the sun gear, respectively. Such undesirable compromising of the oil jets, or of the oil spray mist, respectively, is prevented in a simple manner by way of the aforedescribed oil supply installations. It is moreover guaranteed by way of the oil supply installations that only fresh cold oil impacts the respective target gear, thus ensuring a consistent quality of the oil lubrication and oil cooling.

A shielding region represents in each case a special add-on construction, or a protective shield, respectively, on the main body of the spray bars. Said protective shields are in each case disposed between the oil that is ejected from a gear and openings (jet holes) of the spray bars. The protective shields collect the ejected oil and guide the oil in a directed manner to the planet carrier or in the direction of a gear groove between two gear regions of a gear. This transporting mechanism of the oil can be facilitated by centrifugal force acting on the oil present in the oil collection grooves, or in the oil collection groove, respectively, when the oil supply installations 42 rotate conjointly with the planet carrier or with a further component of the planetary gearbox.

Furthermore, the protective shields, or the shielding regions, respectively, can be embodied having openings such as ducts or bores which enable the oil to be directed away in the direction of the planet carrier, or toward the gear central axis, or the gear groove, respectively, in a manner facilitated by the centrifugal force.

Depending on the respective specific application, there is the possibility for oil to be directed or sprayed, respectively, from an oil supply installation 42 only in the direction of the sun gear 28. Furthermore, it can also be provided that the sun gear 28 is impinged with oil emanating from a plurality of oil supply installations 42 that are disposed so as to be distributed about the circumference of the sun gear 28. Additionally, there is the possibility for both the gear 28 and one of the planetary gears 32A to 32D to be sprayed, or to be impinged, respectively, with oil emanating from an oil supply installation 42. In the case of a further embodiment of the planetary gearbox 30, it is in turn provided that both the sun gear 28 and one of the planetary gears 32A to 32D, and additionally also the ring gear 38, are impinged with oil emanating from one or a plurality of oil supply installations 42.

An oil supply installation can be positioned either in front of the inward-running or in front of the outward-running gear. Moreover, there is also the possibility for two different regions of a gear, or two different gears, to be impinged or sprayed, respectively, with oil from a common oil supply installation.

Furthermore, it is guaranteed by way of the aforedescribed embodiment of the planetary gearbox 30 that the gears of the planetary gearbox 30 are impinged with fresh oil of a defined quality, that is to say at a defined oil temperature and with correspondingly filtered oil. A reliable operation of the planetary gearbox 30 is guaranteed on account thereof.

LIST OF REFERENCE SIGNS

9 Primary rotation axis
10 Gas turbine engine
11 Engine core
12 Air intake
14 Low-pressure compressor
15 High-pressure compressor
16 Combustion installation
17 High-pressure turbine
18 Bypass thrust nozzle
19 Low-pressure turbine
20 Core thrust nozzle
21 Engine nacelle
22 Bypass duct
23 Thrust fan
24 Support structure
26 Shaft, connecting shaft
27 Connecting shaft
28 Sun gear
29 Carrier element
30 Planetary gearbox
32A to 32D Planetary gear
34 Planet carrier
36 Linkage
38 Ring gear
40 Linkage
42, 42A to 42D Oil supply installation
44 External side of the oil supply installation
46, 46A to 46D2 Shielding region
48, 48A to 48D2 Opening
50 Free end of the shielding region
52, 52C, 52D Main body
54, 54A to 54D Oil collection groove
56 Cylindrical region of the main body
58 Supply line
60 Triangular region of the main body
62 End region of the main body
64, 64A, 64B End region of the oil collection groove
65, 65A, 65B End region of the oil collection groove
66, 66A, 66B Flow direction
67, 67A, 67B Flow direction
68 Center of the oil collection groove
70 Profile of the base of the oil collection groove
72 Central outlet region
74 Free end of the triangular region
76A, 76B Further openings
78 Oil
80 Base of the oil collection groove
82 Center between end regions of the oil collection grooves
A Core airflow
B Bypass airflow
DR28 Primary rotating direction of the sun gear
DR34 Rotating direction of the planet carrier
DR32 Rotating direction of the planetary gear
DR42 Rotating direction of the oil supply installation
FK Centrifugal force
OEA32A or OEA28 Oil splashing direction
SR42, SR42A to SR42D2 Outflow direction
V46, V46A to V46D Profile of the shielding region
α Angle
β Angle

The invention claimed is:

1. A planetary gearbox comprising:
a planet carrier, including a planetary gear that is disposed so as to be rotatable on the planet carrier,
at least one further gear that meshes with the planetary gear,
wherein the planet carrier includes an oil supply installation which comprises a supply line for oil and at least one opening connected to the supply line and configured to direct oil from the supply line in a direction of the planetary gear and/or the at least one further gear, for cooling and/or lubricating; and
wherein the oil supply installation further comprises at least one shielding region which protrudes from an external side of the oil supply installation and which is positioned in front of the opening in relation to a primary rotating direction of the planetary gear and/or the at least one further gear and which forms an oil collection groove on the external side of the oil supply installation that faces the primary rotating direction of the planetary gear and/or the at least one further gear;
wherein the oil collection groove has a consistent depth between a free end of the shielding region and a base of the oil collection groove, wherein the consistent depth is in an axial direction of the planet carrier, between two end regions of the oil collection groove.

2. The planetary gearbox according to claim 1, wherein the at least one shielding region includes two shielding regions that are mutually spaced apart in the axial direction of the planet carrier, the two shielding regions each forming one oil collection groove.

3. The planetary gearbox according to claim 1, wherein an outflow direction of oil from the opening is directed to be at least approximately radial onto the planetary gear or the at least one further gear, and the opening and a profile of the shielding region, proceeding from the external side of the oil supply installation in a direction of a free end of the shielding region, are mutually configured such that the outflow direction of oil and the profile of the shielding region run to be at least approximately mutually parallel, and enclose an acute angle or an obtuse angle.

4. The planetary gearbox according to claim 1, wherein an outflow direction of oil from the opening is directed to be at least approximately tangential onto the planetary gear or the at least one further gear, and the opening and a profile of the shielding region, proceeding from the external side of the oil supply installation in a direction of a free end of the shielding region, are mutually configured such that the outflow direction and the profile of the shielding region enclose an acute angle or an obtuse angle.

5. The planetary gearbox according to claim 1, wherein a plurality of the oil supply installations are positioned in a circumferential region of the planetary gear and/or the at least one further gear.

6. The planetary gearbox according to claim 1, wherein the shielding region in an area of the oil collection groove includes a porous material that absorbs oil.

7. The planetary gearbox according to claim 1, wherein the planet carrier is configured to be rotatable, and the shielding region protrudes in relation to the external side of the oil supply installation such that a centrifugal force acting on oil accumulated in the oil collection groove directs oil toward the base of the oil collection groove.

8. The planetary gearbox according to claim 1, wherein the at least one further gear is embodied as a ring gear, as a sun gear, and/or as a further planetary gear that meshes with the planetary gear.

9. A gas turbine engine for an aircraft, the gas turbine engine comprising:
- an engine core which comprises a turbine, a compressor, and a core shaft that connects the turbine to the compressor;
- a fan which is positioned upstream of the engine core, wherein the fan comprises a plurality of fan blades; and
- the planetary gearbox according to claim 1, which receives an input from the core shaft and delivers a drive output to the fan for driving the fan at a lower rotating speed than the core shaft.

10. The gas turbine engine according to claim 9, wherein the turbine is a first turbine, the compressor is a first compressor, and the core shaft is a first core shaft;
- the engine core further comprises a second turbine, a second compressor, and a second core shaft which connects the second turbine to the second compressor; and
- the second turbine, the second compressor, and the second core shaft are configured to rotate at a higher rotating speed than the first core shaft.

11. A planetary gearbox comprising:
- a planet carrier, including a planetary gear that is disposed so as to be rotatable on the planet carrier,
- at least one further gear that meshes with the planetary gear,
- wherein the planet carrier includes an oil supply installation which comprises a supply line for oil and at least one opening connected to the supply line and configured to direct oil from the supply line in a direction of the planetary gear and/or the at least one further gear, for cooling and/or lubricating; and
- wherein the oil supply installation further comprises at least one shielding region which protrudes from an external side of the oil supply installation and which is positioned in front of the opening in relation to a primary rotating direction of the planetary gear and/or the at least one further gear and which forms an oil collection groove on the external side of the oil supply installation that faces the primary rotating direction of the planetary gear and/or the at least one further gear;
- wherein the at least one shielding region includes two shielding regions that are mutually spaced apart in an axial direction of the planet carrier, the two shielding regions each forming one oil collection groove.

12. The planetary gearbox according to claim 11, wherein the at least one further gear is embodied as a ring gear, as a sun gear, and/or as a further planetary gear that meshes with the planetary gear.

13. A gas turbine engine for an aircraft, the gas turbine engine comprising:
- an engine core which comprises a turbine, a compressor, and a core shaft that connects the turbine to the compressor;
- a fan which is positioned upstream of the engine core, wherein the fan comprises a plurality of fan blades; and
- the planetary gearbox according to claim 11, which receives an input from the core shaft and delivers a drive output to the fan for driving the fan at a lower rotating speed than the core shaft.

14. The gas turbine engine according to claim 13, wherein the turbine is a first turbine, the compressor is a first compressor, and the core shaft is a first core shaft;
- the engine core further comprises a second turbine, a second compressor, and a second core shaft which connects the second turbine to the second compressor; and
- the second turbine, the second compressor, and the second core shaft are configured to rotate at a higher rotating speed than the first core shaft.

* * * * *